US012652314B2

(12) United States Patent
Bernsen et al.

(10) Patent No.:  US 12,652,314 B2
(45) Date of Patent:      Jun. 9, 2026

(54) METHOD, APPARATUSES AND COMPUTER PROGRAM PRODUCT TO PROVIDE WIRELESS CONFIGURATION

(71) Applicant: KONINKLIJKE PHILIPS N.V., Eindhoven (NL)

(72) Inventors: Johannes Arnoldue Cornelis Bernsen, Eindhoven (NL); Ronald Felix Albertus Linders, Eindhoven (NL); Franciscus Antonius Maria van de Laar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 323 days.

(21) Appl. No.: 18/578,410

(22) PCT Filed: Jul. 13, 2022

(86) PCT No.: PCT/EP2022/069526
§ 371 (c)(1),
(2) Date: Jan. 11, 2024

(87) PCT Pub. No.: WO2023/001647
PCT Pub. Date: Jan. 26, 2023

(65) Prior Publication Data
US 2024/0323229 A1      Sep. 26, 2024

(30) Foreign Application Priority Data

Jul. 19, 2021   (EP) ...................................... 21186393
Oct. 11, 2021   (EP) ...................................... 21202031

(51) Int. Cl.
*H04L 9/40*           (2022.01)
*H04L 12/46*        (2006.01)
(Continued)

(52) U.S. Cl.
CPC .......... *H04L 63/18* (2013.01); *H04L 12/4633* (2013.01); *H04L 69/08* (2013.01); *H04L 69/16* (2013.01); *H04W 84/12* (2013.01)

(58) Field of Classification Search
CPC ..... H04L 63/18; H04L 12/4633; H04L 69/08; H04L 69/16; H04W 84/12; H04W 88/10; H04W 12/50; H04W 12/77; H04W 12/35
(Continued)

(56) References Cited

U.S. PATENT DOCUMENTS 9,215,075 B1 * 12/2015 Poltorak ............. H04W 12/033
10,909,830 B1 * 2/2021 Stapleford .............. H04W 4/90
(Continued)

FOREIGN PATENT DOCUMENTS

CA      3074353 A1 * 12/2015   .............. H04W 4/80
ES      2655499 T3 *  2/2018
(Continued)

OTHER PUBLICATIONS

"Draft Device Provisioning Protocol Specification Version 1.2", wi-fi alliance (Mar. 3, 2020), pp. 1-174.
(Continued)

*Primary Examiner* — Mahendra R Patel

(57)                ABSTRACT

A network access device (130) is described arranged to cooperate with a configurator (120) according to a configuration protocol (DPP) that enables to configure wireless
(Continued)

networks and wireless devices. The network access device has a transceiver (131) for wireless communication (Wi-Fi), and a processor (132) arranged to accommodate an operational network (161) arranged to enable access to an external network (152) using a network communication protocol (TCP/IP), and a configuration network (162) arranged not to provide access to the external network after configuration of the operational network. The network access device provides out-of-band (OOB) information on the configuration network for enabling the configurator to cooperate with the network access device, and accommodates, while cooperating with the configurator via the configuration network, configuration of the operational network, and configuration of the wireless communication device (110) to enable association of the wireless communication device with the operational network.

16 Claims, 18 Drawing Sheets

(51) Int. Cl.
*H04L 69/08* (2022.01)
*H04L 69/16* (2022.01)
*H04W 84/12* (2009.01)

(58) Field of Classification Search
USPC .......................................................... 455/411
See application file for complete search history.

(56) References Cited

U.S. PATENT DOCUMENTS

| | | | | |
|---|---|---|---|---|
| 11,122,431 B2 * | 9/2021 | Pazhyannur | .......... | H04W 8/183 |
| 2017/0257819 A1 * | 9/2017 | McCann | ................ | H04L 67/56 |
| 2019/0306710 A1 * | 10/2019 | Cammarota | .......... | H04W 12/06 |
| 2019/0332774 A1 * | 10/2019 | Nix | .......................... | H04L 9/006 |
| 2019/0356482 A1 | 11/2019 | Nix | | |
| 2021/0258787 A1 * | 8/2021 | Bernsen | .............. | H04L 63/0823 |

FOREIGN PATENT DOCUMENTS

| | | | | |
|---|---|---|---|---|
| WO | WO-2010138264 A2 * | 12/2010 | .......... | H04W 60/005 |
| WO | WO-2017099864 A1 * | 6/2017 | ............ | H04W 12/06 |
| WO | WO-2022015229 A1 * | 1/2022 | ........ | H04W 36/0069 |

OTHER PUBLICATIONS

International Search Report for PCT/EP2022/069526 filed Jul. 13, 2022.
IEEE Standard for Local and metropolitan area networks—Bridges and Bridged Networks. IEEE (2014).
DNS-Based Service Discovery. Internet Engineering Task Force (IETF) (2013). https://datatracker.ietf.org/doc/rfc6763.
Wi-Fi Easy Connect Specification, Version 2.0. WiFi Alliance. (2020) https://www.wi-fi.org/downloads-public/Wi-Fi_Easy_Connect_Specification_v2.0.pdf/35330.
Part 11: Wireless LAN Medium Access Control (MAC) and Physical Layer (PHY) Specifications. IEEE Computer Society (2016).

* cited by examiner

*1000*
*1100*
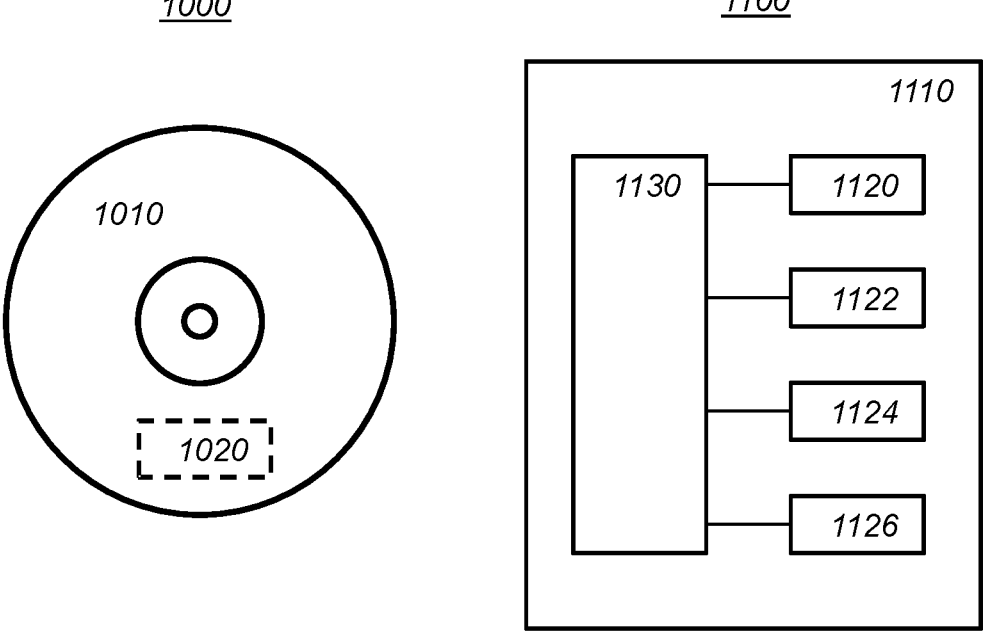
Fig. 18a                    Fig. 18b

METHOD, APPARATUSES AND COMPUTER PROGRAM PRODUCT TO PROVIDE WIRELESS CONFIGURATION

CROSS-REFERENCE TO PRIOR APPLICATIONS

This application claims the priority benefit under 35 U.S.C. § 371 of International Patent Application No. PCT/EP2022/069526, filed on Jul. 13, 2022, which claims the priority benefit of EP patent application Ser. No. 21/202,031.7, filed on Oct. 11, 2021 and EP patent application Ser. No. 21/186,393.1, filed on Jul. 19, 2021, the contents of which are herein incorporated by reference.

FIELD OF THE INVENTION

The invention relates to a method and device to provide and configure a wireless network.

BACKGROUND OF THE INVENTION

Wireless devices may securely connect to a wireless network using a configuration protocol, for example the Device Provisioning Protocol (DPP, see [DPP]), which is a protocol for configuring the wireless communication device, e.g. communicating according a wireless communication protocol such as Wi-Fi, using a DPP Configurator device in order to get access to a wireless network (identified by a Service Set Identifier, SSID) provided by a network access device, e.g. a Wi-Fi Access Point (AP). A wireless device trying to get access is called a DPP Enrollee. It is noted that, in this application, the acronym DPP means any version of DPP, e.g. DPP R1. DPP R2 and any successor release. Recently, the Wi-Fi Alliance decided to replace the name DPP by Wi-Fi Easy Connect. These names are used interchangeably in this text.

The DPP specification [DPP] specifies specific Wi-Fi frames for the exchange of DPP messages. Almost all DPP messages use 802.11 Public Action frames with the exception of the DPP Configuration Request/Response frames, which include a similar header format, but are exchanged using vendor specific Generic Advertisement Service (GAS) Public Action frames. We call the usage of DPP with these specific Wi-Fi frames "DPP over Wi-Fi" in this text. These specific Wi-Fi frames can be sent by one Wi-Fi device to any other Wi-Fi device in radio range (RF range). Note that these specific Wi-Fi frames do not require the sending and receiving devices to be associated with an AP. It is also not required that either of the two devices has to be an AP. This is in contrast with the transfer of TCP/IP packets over Wi-Fi for which a Wi-Fi device needs to associate with an AP first and connect to the network (or SSID) that the AP is providing. TCP/IP packets are the packets that are used by much of the Internet traffic such as e.g. web browsing. TCP/IP packets can be addressed to any IP address and can travel from device to device over many hops. Hops are the links between these devices. These links may use a link layer technology such as Ethernet, or Wi-Fi. In other words, the specific Wi-Fi frames are messages on the so-called link layer or layer 2 messages and the TCP/IP packets are transferred on the network layer or layer 3 of the ISO-Open Systems Interconnection (OSI) model of networking.

The implementation of the DPP protocols requires access to low-level software in a Wi-Fi enabled device. This may not be a problem for a device running an open OS such as Linux, but it is very difficult or impossible to access this low-level software by an app on a smart phone. This makes it impossible for e.g. the manufacturer of Wi-Fi Access Points (AP) that support DPP to provide an app with their AP that can run on a common smart phone which smart phone does not support DPP over Wi-Fi and with which app they can configure their AP using DPP over Wi-Fi.

An addition in release 2 of the DPP specification is the specification of how the above-mentioned specific Wi-Fi frames can be tunneled over a TCP/IP connection. This is called "DPP over TCP/IP" in this text. This addition enables devices that do not support DPP over Wi-Fi to configure other DPP devices. Another addition in release 2 of the DPP specification is the specification of a DPP over TCP/IP relay. A device supporting DPP over Wi-Fi may make this relay available. The relay transforms incoming "DPP over TCP/IP" packets into "DPP over Wi-Fi" frames and transmits them as Wi-Fi frames using its Wi-Fi radio. The relay also transforms received "DPP over Wi-Fi" frames into "DPP over TCP/IP" frames and forwards them as TCP/IP packets over its Ethernet connection(s) and over the Wi-Fi networks (or SSIDs) it has associated with as Wi-Fi non-AP device or the Wi-Fi networks (or SSIDs) that it provides as an AP.

Network access devices, e.g. APs, may, out-of-the-box, create a, usually open. Wi-Fi network (or Service Set Identifier (SSID)) on which they have a server running that implements a user interface (UI) through which they can be configured. The IP address of this UI server is usually the gateway address of the TCP/IP stack of the device. The gateway address of a router such as an AP is the interface through which it sends packets out of its local network and usually to the Internet. Through the UI, the e.g. initially open network may be configured to become secure using a Wi-Fi passphrase or a Pre-shared Key (PSK). The UI server itself may also be protected by a user ID/password combination. The AP may support multiple SSIDs using only one radio using a technique called VLAN (virtual local area network) tagging, see [802.1Q].

A network access device (AP) may provide TCP/IP access to itself for being configured using DPP over TCP/IP in various ways:

the AP may provide TCP/IP access for configuration through USB, which is cumbersome for the user, because he has to connect his configurator with a cable to the AP. Moreover, it more or less defeats the point of the AP being a wireless device.

the AP may provide TCP/IP access for configuration through Ethernet, which is cumbersome for the user for the same reasons as above. Besides, smart phones usually do not have an Ethernet connector.

the AP may provide TCP/IP access for configuration through a connection with a secure Wi-Fi network (or SSID) run by the AP with a security other than DPP. This is cumbersome for the user, because now, he has to configure his configurator for the secure non-DPP network, which defeats the purpose of DPP as a user-friendly way to configure Wi-Fi networks securely.

The above examples are less convenient. More conveniently, the AP may provide TCP/IP access for configuration through a connection with an open Wi-Fi network run by the AP, e.g. Wi-Fi Enhanced Open [WiFi_EO], or a legacy network without encryption. However, such open network configuration has a problem. The user may connect, also called "associate" using 802.11 terminology, his configurator device to the open network for configuration and configure the AP. The configurator device may set-up a Pre-shared Key for this open network, without the user having to think of or enter a PSK, so other devices can from this point on be barred from using this network. However, once an AP that supports DPP over Wi-Fi has been configured using DPP over TCP/IP using the open network and the user wants, e.g. for security reasons, have the AP only running a DPP network, the open network has to be shut down. This means that a configurator device that does not support DPP over Wi-Fi cannot configure the AP anymore.

SUMMARY OF THE INVENTION

Network configuration as described above has problems, inter alia that the legacy DPP implementation of the DPP protocols requires access to very low-level software in a Wi-Fi enabled device.

It is an object of the invention to provide methods and devices for configuring a network that alleviate at least one of the above-mentioned problems. For this purpose, devices and methods are provided as defined in the appended claims. According to an aspect of the invention a network access device is provided as defined in claim 1. According to a further aspect of the invention a configurator is provided as defined in claim 10. According to further aspects of the invention, devices and methods are provided as defined in the independent claims.

Effectively, the network access device and the configurator cooperate to provide a first wireless network as an operational network arranged to enable access to the external network, such as the internet, via a network connection according to a network communication protocol such as TCP/IP. In addition thereto, a second wireless network is provided as a configuration network arranged not to provide access to the external network. Wireless communication across the wireless networks is provided via a transceiver for wireless communication according to a wireless communication protocol such as Wi-Fi.

The configuration network is an open network, arranged to not provide access to the external network after configuration of the operational network. Thereto, access to the external network may not be provided at all, or may be stopped after an initial period where said access is temporary allowed. In the event of initial temporary access, at least at some point after configuration of the operational network said access will be disabled, e.g. actively terminated or prohibited, or effectively prohibited by switching off the configuration network. The operational network is a wireless network configured according to a configuration protocol, for example a device provisioning protocol like DPP, that further enables the configurator to configure wireless communication devices, called Enrollees, to associate with the operational network. The operational network then provides access to the external network for said Enrollees.

Advantageously, the configuration network is an open network that enables the configurator to configure networks as provided by the network access device and wireless devices that need accessing a wireless network. The openness of the configuration network has an advantage in that it enables the configurator to use it without user intervention for associating with it. The configurator is enabled to transfer all configuration messages via the configuration network connection, so no access is required to a transceiver in the configurator for using the wireless communication protocol (Wi-Fi) for transceiving, for example, the special Wi-Fi frames for DPP (DPP over Wi-Fi). Moreover, accessing the external network via the open configuration network is not enabled.

The configurator may be embedded in a single device, e.g. embedded in a smart phone. Also, the configurator may comprise multiple separate units, which units may be stand-alone devices, or may be combined with other devices. For example, the configurator may comprise a configurator interface and a configurator controller. When the configurator interface and configurator controller are located in different devices, they each may have a wireless transceiver which enables them to communicate with one another using the configurator interface protocol over the configuration network. The configurator interface may be embedded in a smart phone, while the configurator controller may be embedded in a network access device such as an access point. The configurator controller may also be embedded in a PC or may be a standalone device coupled to a PC or an access point via a wired or wireless connection.

The configuration protocol may be a device provisioning protocol defining configuration of a wireless network and wireless devices, but may also comprise a configurator interface protocol defining communication between the configurator interface and the configurator controller.

The configurator controller may comprise a processor arranged for said configuration of the operational network via a device provisioning protocol, and/or said configuration of the wireless communication device via a device provisioning protocol. The configurator controller may apply a device provisioning protocol defining configuration of a wireless network and wireless devices, while communicating with the configurator interface via said configurator interface protocol.

The configurator interface has a configurator interface processor arranged to acquire, using an out-of-band channel, the out-of-band information on the configuration network for enabling the configurator to cooperate with the configurator controller, for example a camera to scan a DPP bootstrapping URI of the network access device, or a wireless communication device or an NFC reader for performing an NFC Touch with the network access device or wireless communication device. The configurator interface may be embedded in a wireless device like a smart phone. The configurator controller may be arranged to cooperate with the configurator interface via the configuration network.

The configurator controller has a processor arranged for said configuration of the operational network via a device provisioning protocol (DPP), and/or said configuration of the wireless communication device via a device provisioning protocol (DPP).

On the configuration network, a configuration tunnel and a configuration relay may be provided. The tunnel enables messages according to the configuration protocol to be transferred via the configuration network connection to, and from, a configuration unit in the network access device. A configurator or configurator controller may configure the configuration network through the configuration tunnel.

The configuration relay may be arranged for relaying, via the configuration network connection, configuration messages according to the configuration protocol using the wireless communication protocol, which are transmitted and received via the transceiver. Thereby configuration messages received via the transceiver are converted into messages via the configuration network connection (DPP over TCP/IP); and, vice versa, configuration messages via the configuration network connection are converted into messages transmitted via the transceiver. For example, such configuration messages may so-called "DPP over Wi-Fi" messages, which involve use of the special Wi-Fi frames for DPP as described in the detailed description below. So, a configurator may configure a wireless communication device through the configuration relay. While doing so, the configurator may e.g. use the DPP over TCP/IP protocol between itself and the configuration relay.

The network access device provides information to connect to the configuration network using an out-of-band channel, such as a QR code of the network access device to be scanned by a camera in the configurator. The out-of-band (OOB) information may contain access data for the configuration network and may further provide information for accessing the configuration tunnel for enabling the configurator to connect to a configuration module in the network access device for configuring the operational network.

The out-of-band (OOB) information may further contain information for accessing the configuration relay including a relay port address according to the network communication protocol. A port address may be an IP address together with a port number. The port number to use may be specified, for example, in the DPP specification. However, the port address may just mean only the IP address of the item to be accessed.

The network access device may accommodate, while cooperating with the configurator, configuration of the operational network via the configuration tunnel, and configuration of the wireless communication device via the configuration relay to enable association of the wireless communication device with the operational network.

Optionally, arranging the configuration network not to provide access to the external network after configuration of the operational network may be achieved by not providing access to the external network at all via the configuration wireless network. Alternatively, said access may be provided only initially or temporarily, and may be terminated at a later point in time. For example, the processor may be arranged to initially provide, but later inhibit access to the external network via the configuration network after said association of the configurator to the configuration network, either upon completion of said association or at a later point in time, e.g. via a predetermined time-out or a time-out after configuration of the operational network. Also, said access may be stopped by providing the initially open configuration network with appropriate security, e.g. based on a passphrase. Upon said security being effective other devices cannot get access to the configuration network, and subsequently to the external network, without knowing and using the passphrase.

So 'after configuration of the operational network' does not imply immediately following the association, nor does it imply that access was provided before that moment. However, after the operational network has been configured and a predetermined operational status has been achieved, using the configuration network as an open network for accessing the external network is prevented. Finally, said 'non providing access' may also be accommodated by terminating the configuration network, e.g. upon completion of the configuration or upon a time-out starting at power-up of the access device. Further preferred embodiments of the devices and methods according to the invention are given in the appended dependent claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which

FIG. 18a shows a computer readable medium, and FIG. 18b shows in a schematic representation of a processor system.

The figures are purely diagrammatic and not drawn to scale. In the Figures, elements which correspond to elements already described may have the same reference numerals.

DETAILED DESCRIPTION OF EMBODIMENTS

Figure 1:
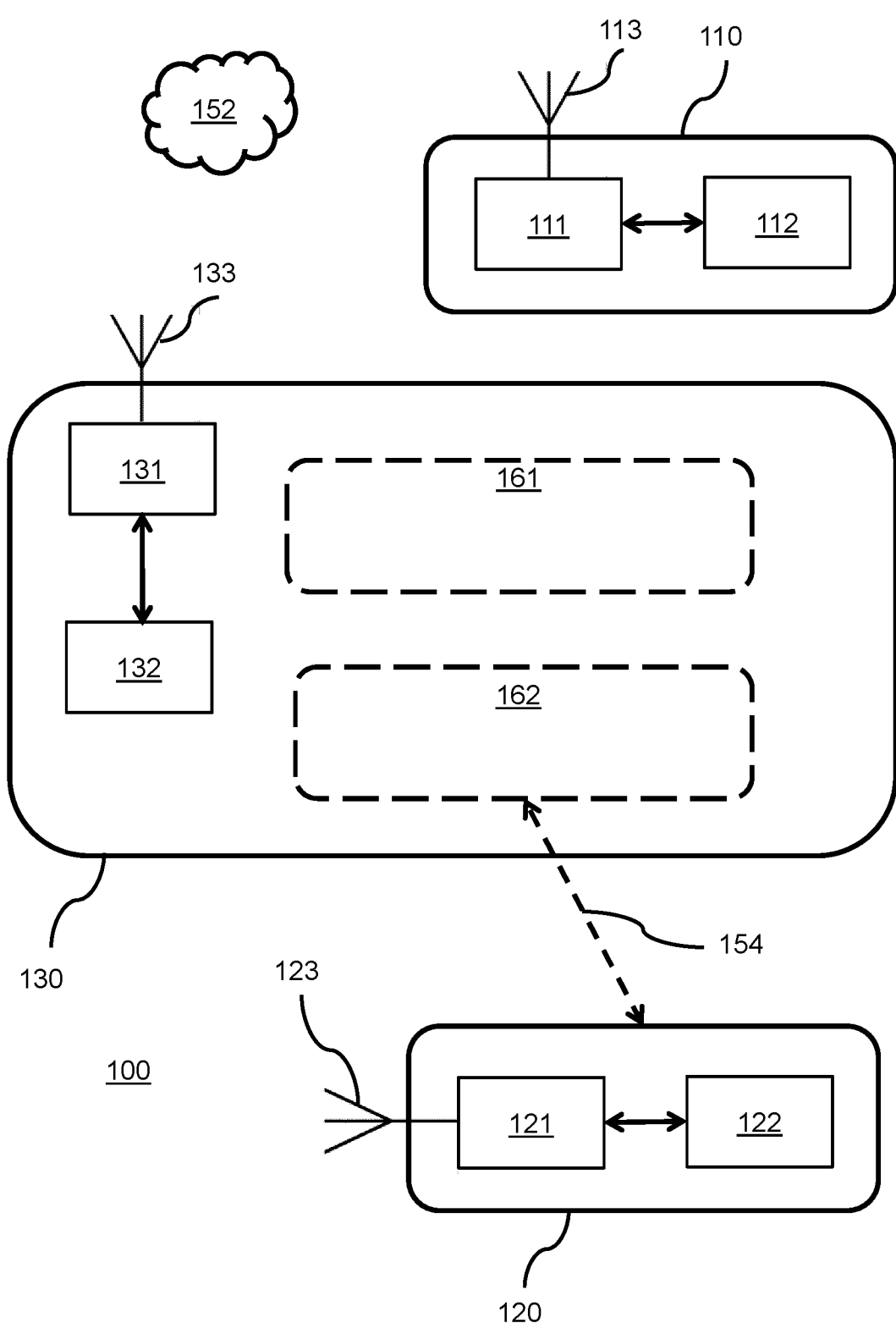
FIG. 1 shows a communication system in which the invention may be practiced.

FIG. 1 shows a communication system 100 comprising first 110, second 120 and third devices 130. An external network 152 is also shown, for example the internet. Each of these devices has a transceiver 111, 121, 131 comprising suitable transmitters and receivers for wireless communication over a physical channel such as Wi-Fi. Bluetooth™ or any other suitable technology. The devices may have an input/output unit for communicating over a wired physical channel, and may comprise at least one antenna 113, 123, 133 acting as input/output for a wireless physical channel. Each of the devices would operate under the control of a processor 112, 122, 132. The transceiver, the processor and further elements of the device may be integrated in a single system on a chip. Communication between the transceiver and the processor is schematically indicated by a solid arrow. Each of the devices may have a user interface having at least one user control element (not shown). For example, the user control element may comprise a touch screen, various buttons, a mouse, touch pad and so on. Buttons may be traditional physical buttons, touch sensors, or virtual buttons, e.g. on a touch screen or icons to be activated via a mouse. The user interface may also be a remote user interface.

The second device may be a network access device 130 for providing wireless networks, for example an access point, a router, etc. The first device may be a wireless communication device 110 such as a mobile phone, laptop or tablet having an end user. It could also be an IoT (internet of things) type of device. The user of the first device may be interested in getting connected to the network access device for accessing one or more resources provided via the second device, for example to access an external network 152 like the internet. The wireless communication device 110 may be called an enrollee desiring to associate with the wireless network.

The third device may be a configurator 120 for configurating a wireless network according to a configuration protocol that enables to configure wireless networks and wireless communication devices to associate with a wireless network. The network access device 130 is arranged to cooperate with the configurator 120 according to the configuration protocol.

In the network access device, the processor 132 may be arranged to accommodate a first wireless network as an operational network 161. The operational network may be arranged to enable access to an external network 152 using a network communication protocol, for example TCP/IP. Furthermore, the processor may be arranged to accommodate a second wireless network as a configuration network 162 arranged not to provide access to the external network 152 after configuration of the operational network. In a practical example both wireless networks have respective network identifiers, e.g. SSID, while virtual local area network, VLAN, technology may be applied to create both SSIDs via a single transceiver.

Also, the processor is arranged to enable establishing a configuration network connection 154 according to the network communication protocol (TCP/IP) by association of the configurator to the configuration network.

The network access device may be arranged to provide, using an out-of-band channel, out-of-band (OOB) information on the configuration network for enabling the configurator to cooperate with the network access device. For example, the OOB information may be a QR code including a network identifier SSID and further access data, port addresses, security data etc.

The network access device is further arranged to accommodate, while cooperating with the configurator via the configuration network, configuration of the operational network, and configuration of a wireless communication device to enable association of the wireless communication device with the operational network. Detailed embodiments of the devices and the configuration process are described below.

In the following embodiments the network access device may be called access point AP, the configuration protocol may be the device provisioning protocol DPP, see [DPP]. The wireless communication protocol may be Wi-Fi, and the network communication protocol may be TCP/IP. One of the communicating devices in case of TCP/IP is the TCP client and the other is the TCP server. It may be understood that the other devices may also serve as both TCP client and TCP server. In case the network communication protocol is TCP/IP, the port address or port information may include whether the device is the TCP server or TCP client.

In an exemplary embodiment the issue is how to use an AP that supports DPP, so supports being itself configured by DPP over Wi-Fi, supports being configured itself using DPP over TCP/IP. The AP may also support a relay for DPP over TCP/IP. The AP needs to cooperate with a configurator that does not have a DPP Wi-Fi stack, for example a basic smart phone with a DPP Configurator app doing DPP over TCP/IP. The AP needs to provide TCP/IP access to such a basic configurator.

Providing TCP/IP access to basic configurators by an AP is done through a connection with an, at least initially, open wireless network, usually called association, without encryption, for example Wi-Fi Enhanced Open, see [WiFi_EO]. The network created through the open Wi-Fi connection is identified by a configuration SSID. Later on, another SSID is created by the same AP for operational communication, which is identified by an operational SSID. The configuration SSID may be removed or stopped after configuration. If not, both networks (SSIDs) need to be separated from one another. To accomplish the separation, the AP may use VLAN tagging by creating VLAN1 for the configuration SSID and VLAN2 later on for the operational SSID. The use of a VLAN for the configuration SSID is not required when the configuration SSID is stopped when the operational SSID is started.

For example, for DPP configuration, the AP needs to make two destinations available on the configuration SSID, namely
the IP address/port number for being configured through DPP over TCP/IP itself, and
the IP address/port number of its DPP over TCP/IP relay. The port number to be used in both cases may be 8908, which number is fixed in the DPP specification for the DPP over TCP/IP relay, in which case the port number does not need to be included in the OOB information. Further on it is described how the IP addresses are conveyed. The AP may further indicate in the OOB information whether it is the TCP client or TCP server for each IP address/port number included in the OOB information.

In addition, the AP may make a remote UI available on its configuration SSID for being configured by a user for all non DPP over TCP/IP functionality, e.g. on port 80 of its gateway address. Making a remote UI available by a device on a network may mean, e.g., providing by that device one or more web pages with which a user can interact using, e.g., a browser on another device to control the first device. The gateway address may also be used for being configured through DPP over TCP/IP itself or for the DPP over TCP/IP relay. However, the gateway address cannot be used for both purposes together, since they share the same port number 8908.

The AP may limit the functionality available on the configuration SSID to the above three, i.e. the IP address/port number for being configured itself, the DPP over TCP/IP relay and the remote UI. In particular, access to the external network may not be provided at all, or may at least be limited to be temporary only or limited to specific purposes regarding configuration. Otherwise, any Wi-Fi device might be able to connect to e.g. the Internet.

Optionally, the AP may be set in the above described configuration mode when it is first switched on (so out-of-the-box) and it may also be set in this mode by a specific user action, by pressing a button on the AP, e.g. the reset button, or by selecting a specific command for this on the user interface (UI) of the AP.

In the event that the AP is later on configured to provide a DPP Wi-Fi network or SSID, the AP may make the IP address/port number available on this DPP SSID of its DPP over TCP/IP relay, or a further instance thereof, for configurators that do support a DPP Wi-Fi stack. Effectively, the configurator may then configure Enrollees that only support Wi-Fi bands that the configurator itself does not support, but that the AP does support (e.g. 802.11ah). Existing configurators may have different functionalities, such as a configurator that can do DPP over TCP/IP, which may be called a legacy configurator, and a configurator that can do DPP over Wi-Fi, which may be called a Wi-Fi enabled configurator. See also the explanation below.

The AP may support an IP address/port number for being configured itself by DPP over TCP/IP on the DPP Wi-Fi network (or SSID). Optionally, the AP may be configured by DPP over Wi-Fi and over TCP/IP and providing both may be beneficial, because it can then be configured by each of the two types of configurators. Configurators may connect to the IP address/port for DPP configuration of the AP itself on the Configuration SSID on VLAN1. The AP providing an IP address/port number for being configured itself by DPP over TCP/IP on the DPP Wi-Fi network (or SSID) offers more flexibility for configurators.

The AP may be provided with a DPP bootstrapping URI. The URI is a string with a certain format. That string may contain the usual content such as its public bootstrapping key. MAC address and Wi-Fi channel for the initial Wi-Fi messages of the DPP protocol, see [DPP]. The URI may further contain an identifier attribute, e.g. the SSID attribute indicating the SSID of the configuration SSID, and
    a configuration attribute, e.g. the HOST attribute that indicates the IP address on which the AP itself can be configured using DPP over TCP/IP on the configuration SSID and on any other SSID that the AP supports.

The IP address of the DPP over TCP/IP relay may be made available by e.g.

including a new information element (IE) containing this address in the beacons of the AP, and/or in the probe responses of the AP, see [802.11];
    including this IP address in the DPP bootstrapping URI of the AP, which URI itself can be in the bootstrapping QR code of the AP or in the bootstrapping NFC information of the AP;
    querying some service on the AP, e.g. using DNS-based service discovery (DNS-SD), see [RFC 6763], where DNS stands for the Domain Name System, the phonebook of the Internet;
    specifying the address data in a new version of the configuration protocol, e.g. the DPP specification, e.g. as the gateway address, or another IP address.

Figure 2:
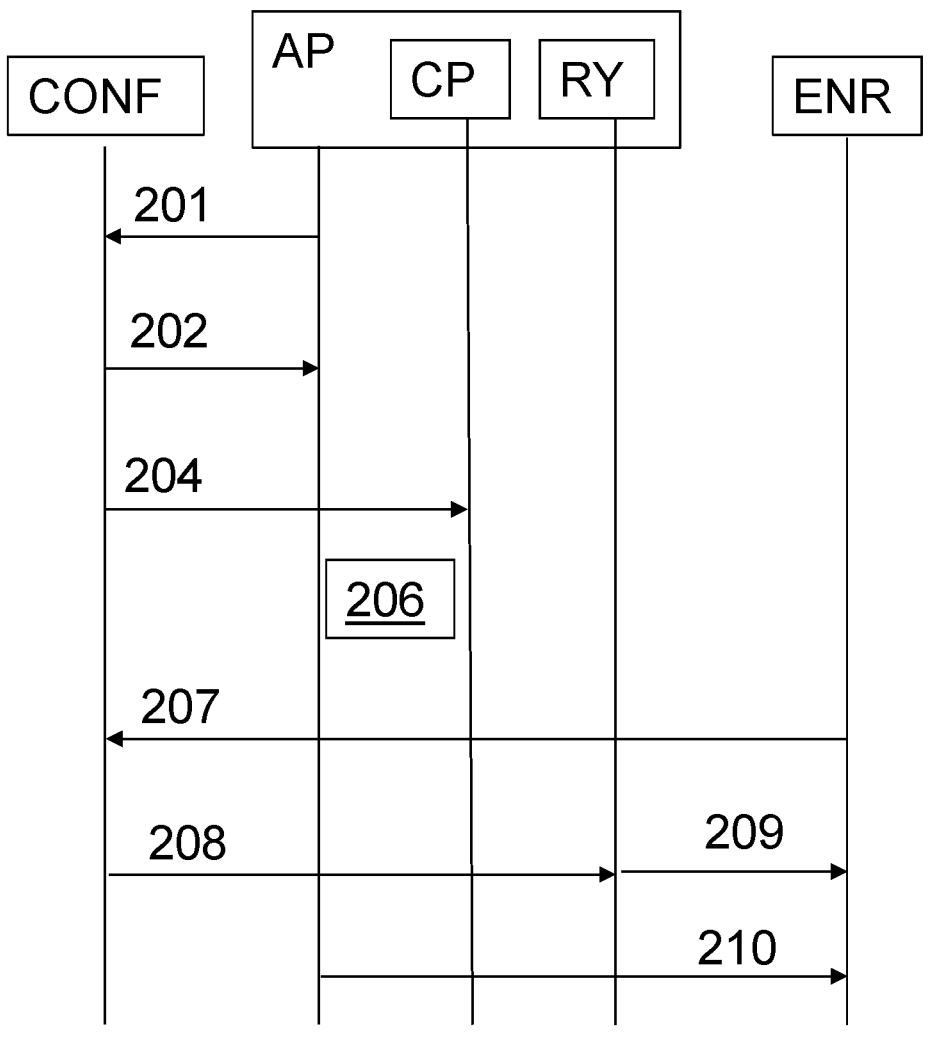
FIG. 2 shows a flow diagram of a configuration process.

FIG. 2 shows a flow diagram of a configuration process. The Figure schematically shows a configurator CONF, an access point AP and an enrollee ENR. The AP has a configuration port CP and a relay port RY. Steps in the configuration process are shown as arrows numbered as elucidated below.

Out-of-the-box and after a return to factory settings reset, the AP configures itself with a configuration SSID as described above. The AP may support the configuration protocol DPP, and may therefore be called a DPP AP, and may support the DPP over TCP/IP relay. Being a DPP AP means also that the AP itself can be configured by DPP Configurators using DPP over Wi-Fi. The AP provides out-of-band (OOB) information, e.g. shows a DPP bootstrapping URI on its display, a sticker or makes it available over NFC. Bluetooth™ or any other suitable Out-of-Band technology. The bootstrapping URI includes the configuration SSID and the IP address for being configured itself by DPP over TCP/IP. This DPP bootstrapping URI makes it also possible to configure this AP using a DPP Configurator that does support DPP over Wi-Fi, but this document does not further describe the DPP over Wi-Fi, see [DPP].

In step 201 "Capture DPP URI (OOB)" the Configurator scans the DPP bootstrapping URI of the AP or gets this through NFC. In step "202 Associate with Configuration SSID" the configurator connects (associates) with the configuration SSID indicated by the SSID attribute in the DPP bootstrapping URI of the AP. The association with the configuration SSID makes it possible for a legacy configurator to set up TCP/IP connections with IP address and port number combinations reachable on network of the configuration SSID. Also, the Configurator learns the IP address of the DPP over TCP/IP relay on the Configuration SSID from the beacon of the configuration SSID or the bootstrapping URI or any of the other ways indicated above.

In step 204 the Configurator uses the combination of IP address indicated by the HOST attribute in the DPP bootstrapping URI of the AP or any of the other ways indicated above and the DPP port number 8908 to configure the AP itself, for example by creating an operational network, using DPP over TCP/IP over the configuration SSID. The new network may be a DPP network, which is assumed in the remainder of these steps, which steps will be explained below with the following figures.

Figure 3:
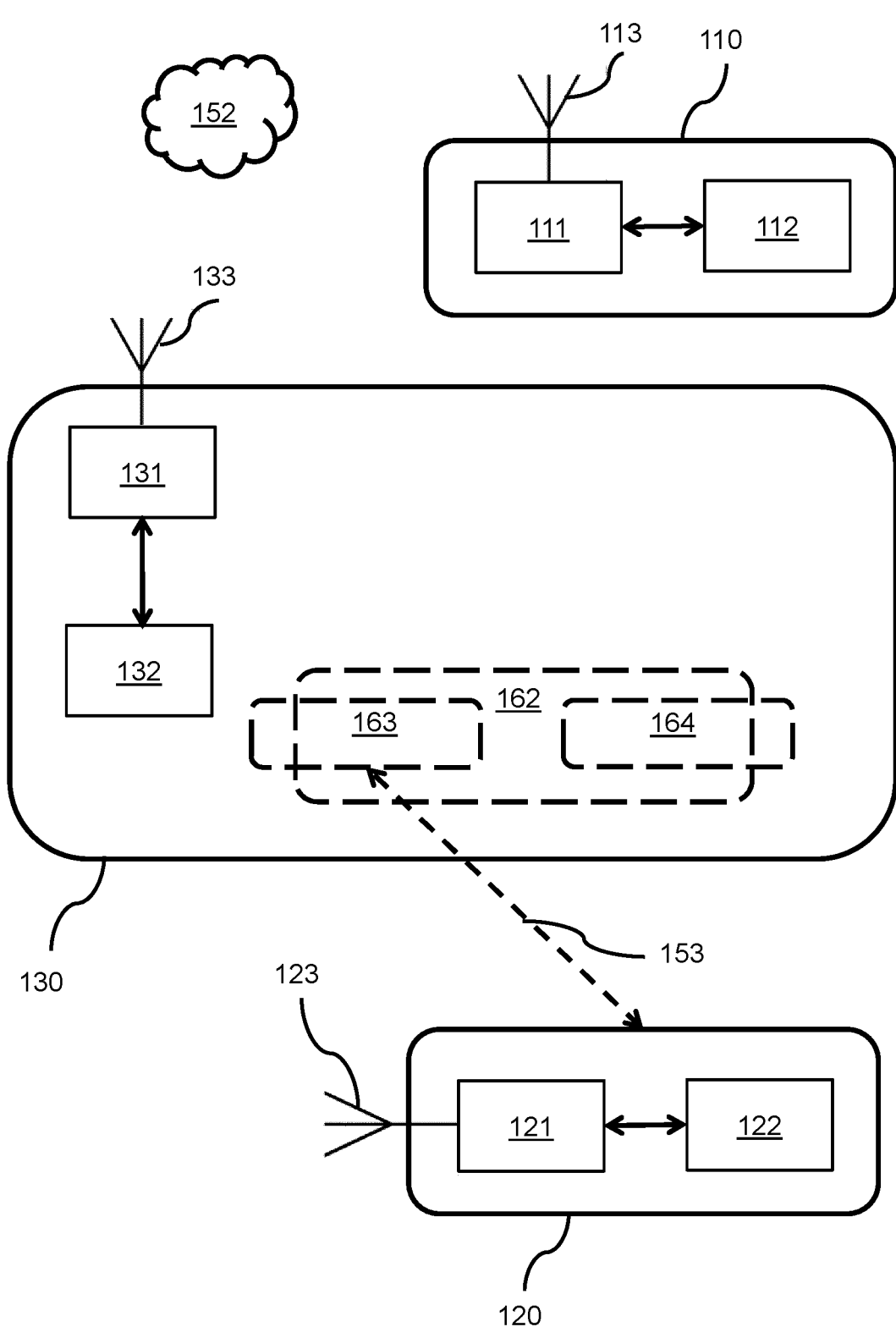
FIG. 3 shows a communication system having a configurator and result of initial configuration steps.

FIG. 3 shows a communication system having a configurator and result of initial configuration steps, numbered 201, 202 and 204 above. The figure schematically shows the devices as described with FIG. 1 and a configuration network 162, e.g. a configuration SSID on VLAN1. Additionally, the configuration network 162 has a configuration tunnel 163, the tunnel enabling messages according to the configuration protocol to be transferred via the configuration network connection, e.g. a DPP over TCP/IP configuration port. The configuration network 162 further provides a configuration relay 164, for example a DPP over TCP/IP relay. The relay is arranged for relaying configuration messages between the configuration network connection and wireless communication. For example, the relay may convert messages on the configuration network to and from special Wi-Frames sent/received via the Wi-Fi transceiver. Hence messages according to the configuration protocol are subsequently transferred using the wireless communication protocol, e.g. DPP over Wi-Fi. Thereto the configuration relay 164 has a part that communicates using TCP/IP packets in the configuration SSID and a part that communicates using the specific Wi-Fi frames outside the configuration SSID, which part is shown extending beyond the dashed box 162. In FIG. 3 an arrow 153 shows the result of steps 201-204 above, providing DPP over TCP/IP through association with Configuration SSID, the arrow coupling the configurator to the configuration tunnel.

Figure 4:
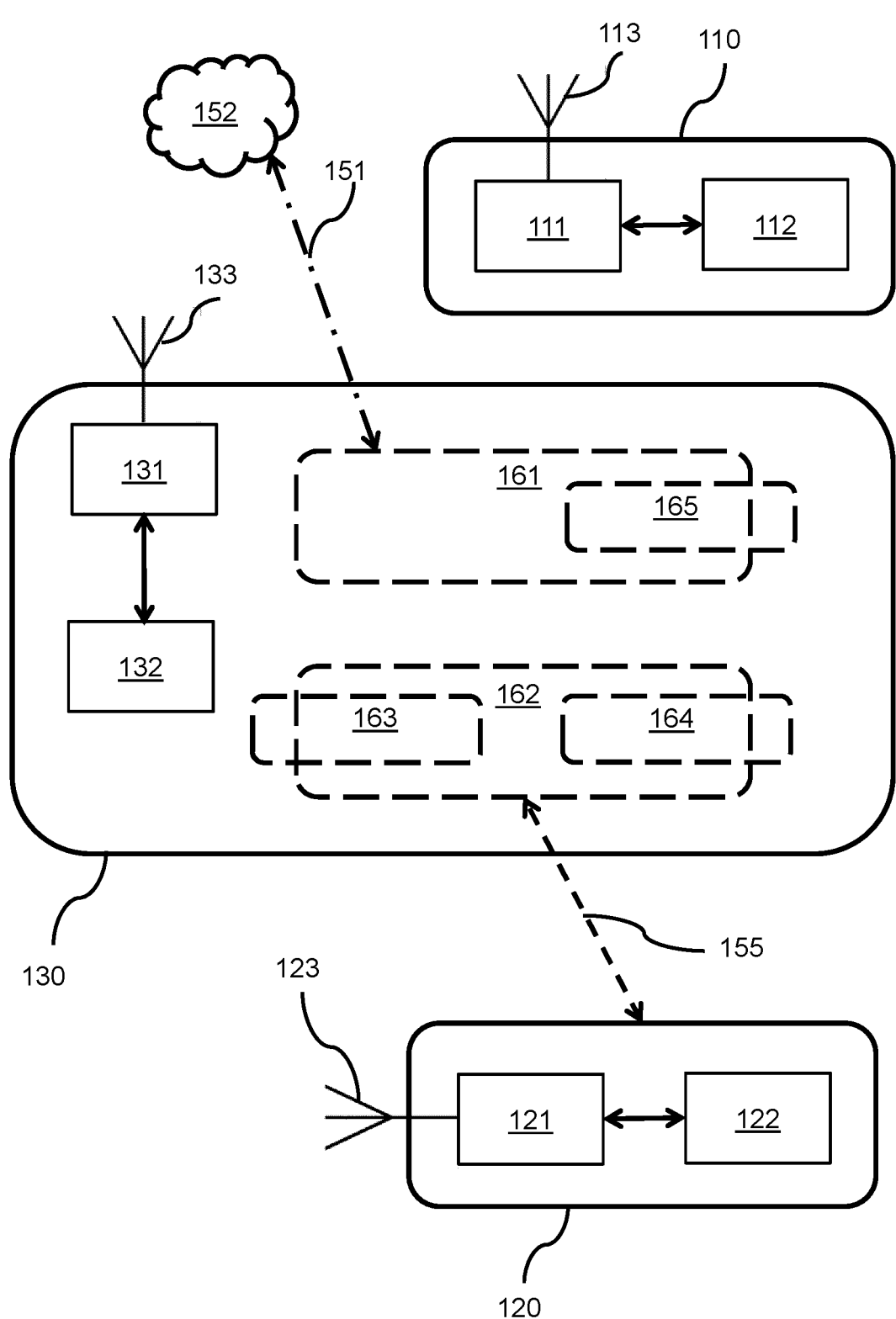
FIG. 4 shows the result of the further configuration steps.

FIG. 4 shows the result of the further configuration steps. The figure schematically shows the devices as described with FIG. 3 and an operational network 161, e.g. a DPP SSID on VLAN2. The configurator has now configured the operational network, which may be a DPP network. i.e. a network where the AP and devices wanting to associate with it exchange their DPP Connectors using the Network Introduction protocol as specified in section 6.6 of [DPP].

The operational network provides access to the external network 152 as indicated by arrow 151, e.g. via a wired ethernet connection. Additionally, the operational network may have a further relay 165, e.g. a DPP over TCP/IP relay. Arrow 155 schematically shows that TCP/IP connections are possible through association with Configuration SSID. In step 204 "Configure AP using DPP over TCP/IP" the AP is configured.

Subsequently, the AP may stop the configuration SSID. If it does that in the case where the newly configured network is DPP only, there is no possibility anymore for legacy configurators to configure the AP. Alternatively, the AP may not stop the configuration SSID. Instead, it keeps it in existence for (re-) configuration by a legacy configurator of the AP itself and of DPP Enrollees by using the DPP over TCP/IP relay on this configuration network. Optionally, when the AP is arranged not to stop the configuration SSID, the legacy configurator may configure the configuration SSID with a personal secret key. PSK, which key may be randomly generated. A Wi-Fi enabled configurator may also configure the configuration SSID with a personal secret key. The PSK is to be used from this point onwards to connect and associate with the configuration SSID for extra security. No user action is required for this security step.

In step 206 "Start DPP SSID" the operational network 161 is started, e.g. the AP starts the DPP network as configured by the Configurator. VLAN tagging may be used to keep the DPP SSID separate from the configuration SSID, thereby preventing any device associating with the configuration SSID of the AP to be able to connect to the external network, e.g. Internet.

Figure 5:
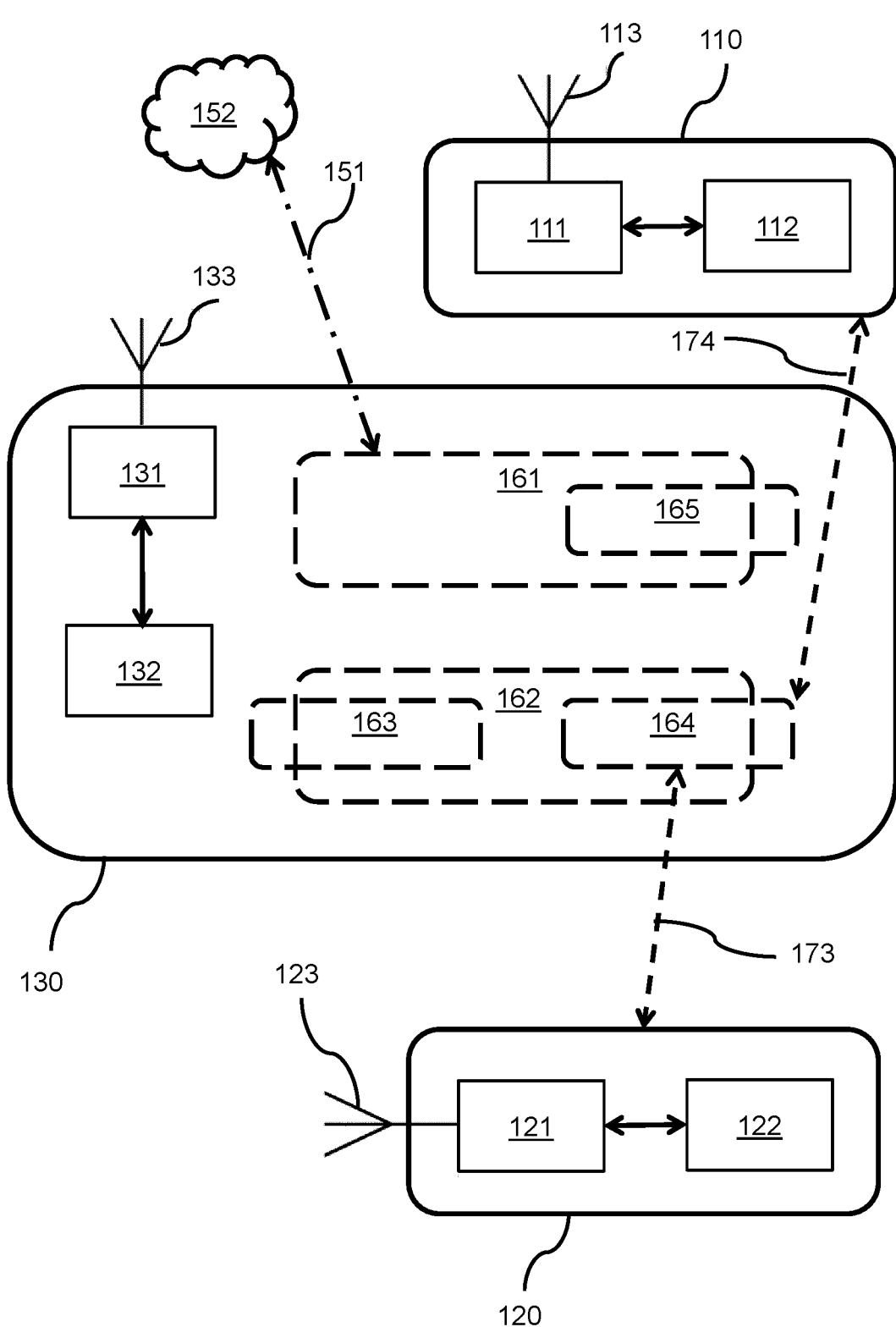
FIG. 5 shows the result of the further configuration steps.

FIG. 5 shows the result of the further configuration steps. The figure schematically shows the devices as described with FIG. 4. In step 207 "Capture DPP URI (OOB)", the Configurator bootstraps with a DPP Enrollee 110 via e.g. capturing a QR code containing the DPP bootstrapping URI of that Enrollee and starts the DPP protocol with the Enrollee via the relay 164, for example with the Enrollee as a Responder.

Starting the configuration protocol may be via the TCP/IP connection on the configuration SSID of the AP using the IP address/port 8908 of the DPP over TCP/IP relay, subsequently using DPP over Wi-Fi. In step 208 "Configure DPP Enrollee using DPP over TCP/IP", the Configurator configures the DPP Enrollee through the DPP over TCP/IP relay of the AP as indicated by an arrow 173. Subsequently, in step 209 "DPP over Wi-Fi" the messages are transferred using the wireless network protocol, as indicated by an arrow 174.

Figure 6:
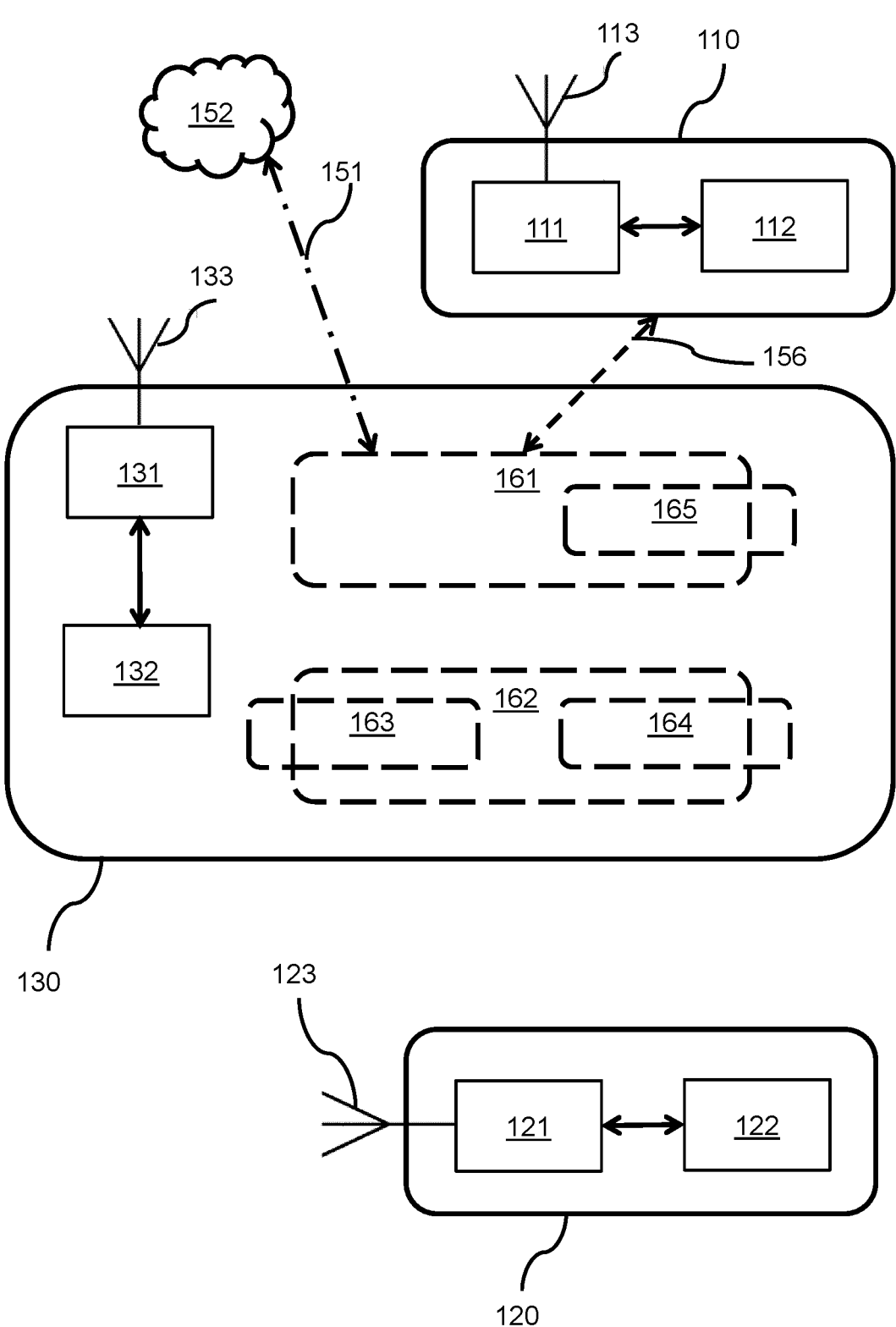
FIG. 6 shows the result of the further configuration steps

FIG. 6 shows the result of the further configuration steps. The figure schematically shows the devices as described with FIG. 5. In a final step 210 "Associate with DPP SSID" the enrollee configured by the configurator in the preceding steps 208, 209, now connects to the operational network by association. Arrow 156 indicates that TCP/IP connections are possible through said association with DPP SSID.

Figure 7:
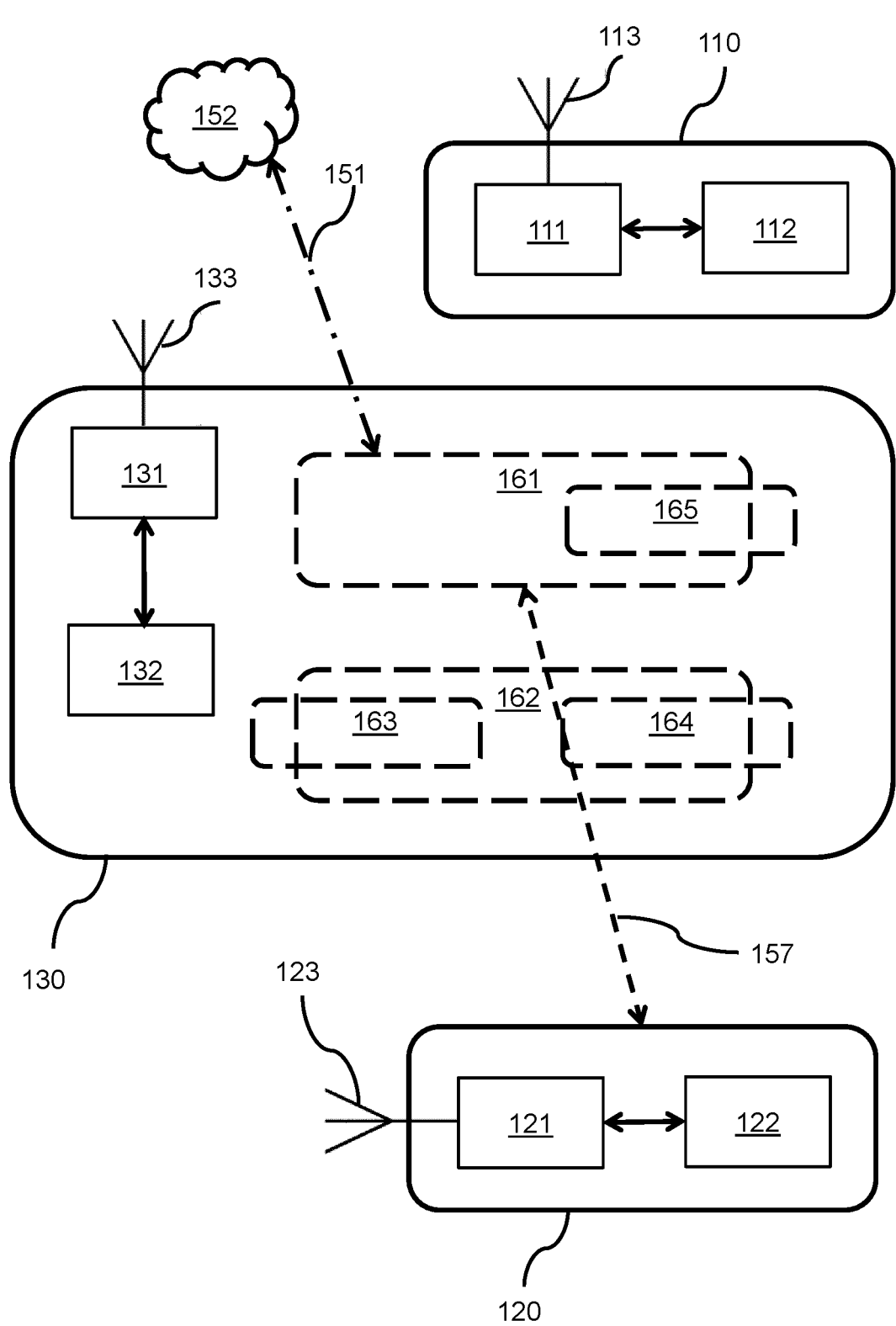
FIG. 7 shows the result of initial configuration steps of a further embodiment.
Figure 8:
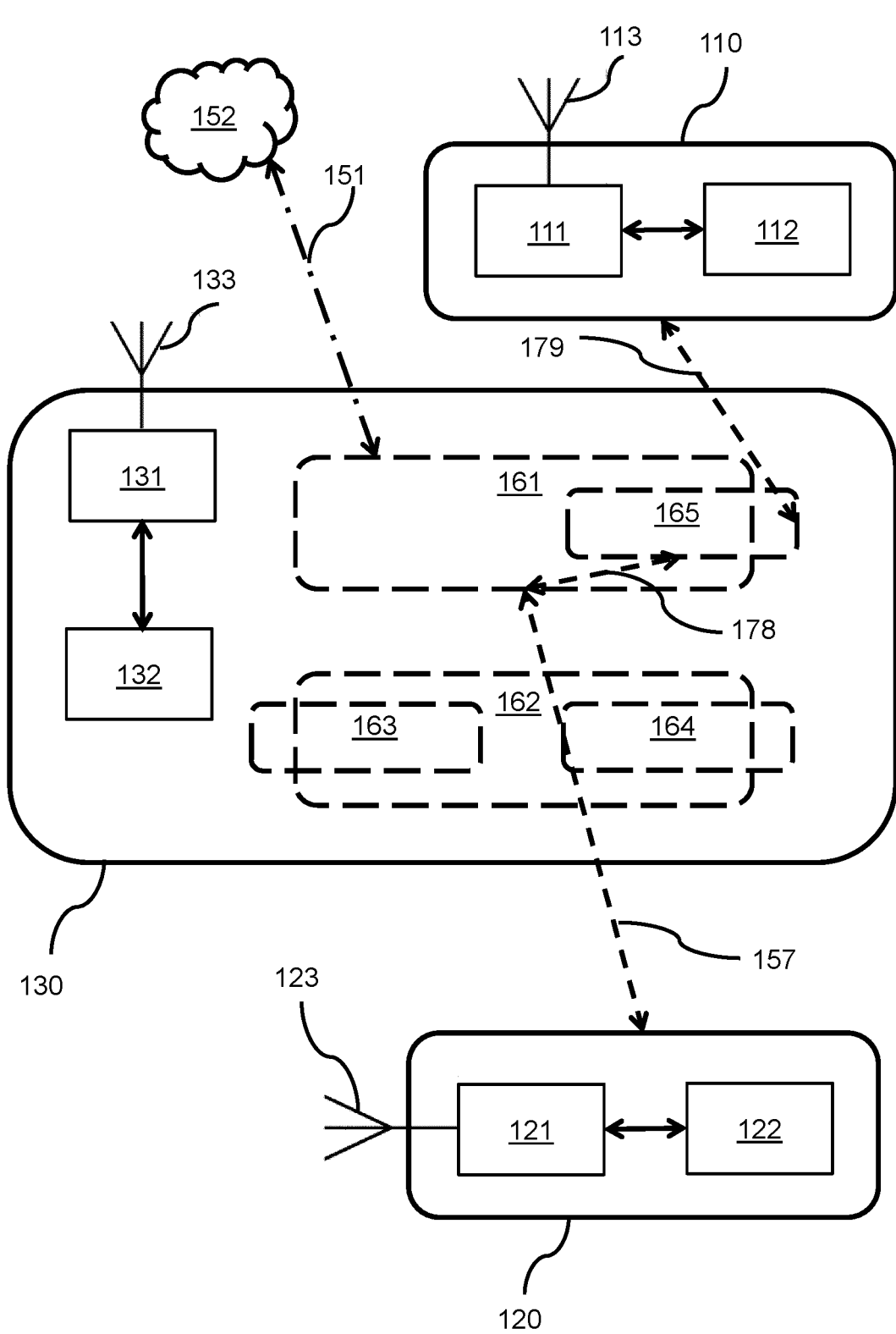
FIG. 8 shows the result of the further configuration steps.
Figure 9:
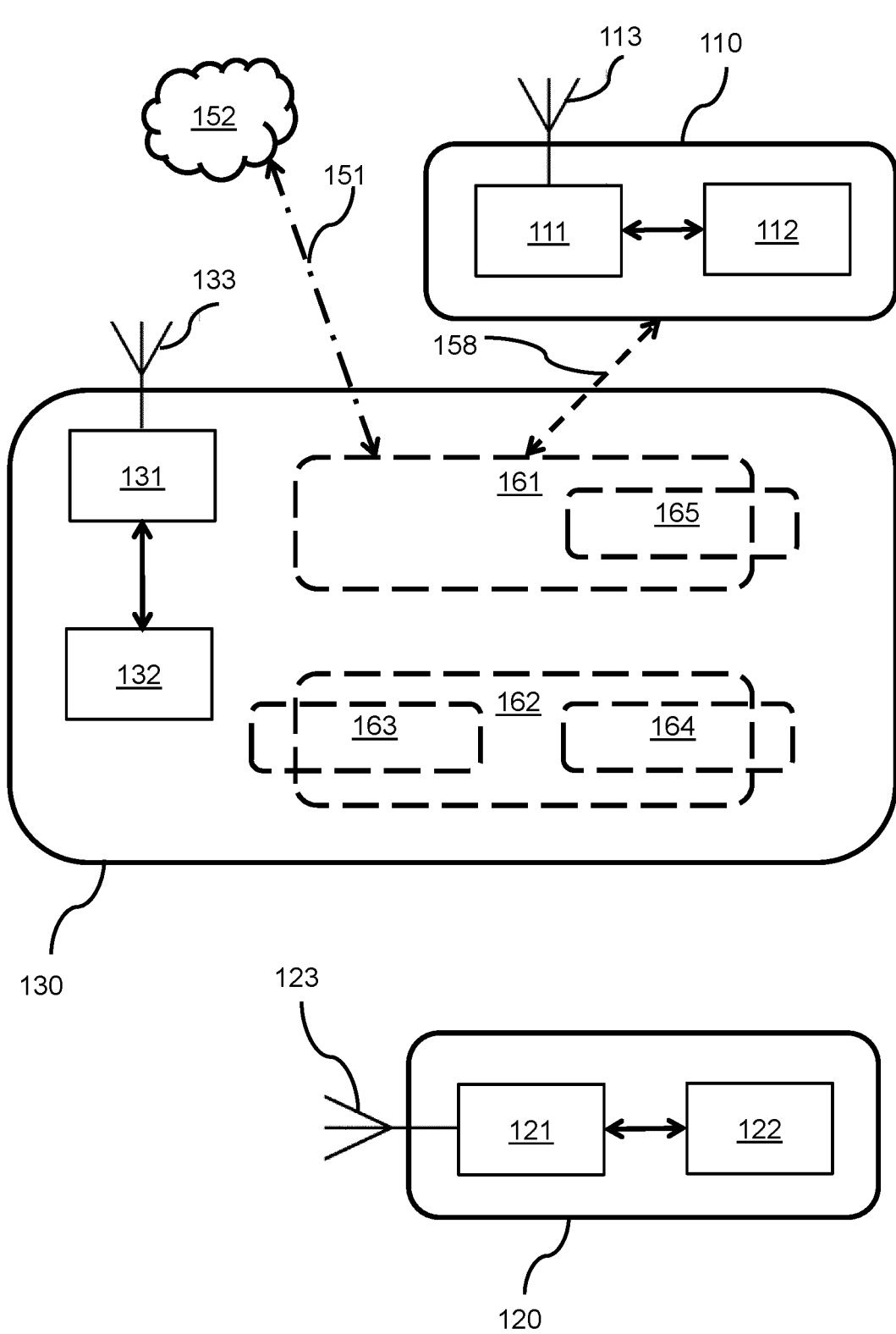
FIG. 9 shows the result of the further configuration steps.

A further embodiment is elucidated with the FIGS. 7-9.

FIG. 7 shows the result of initial configuration steps of a further embodiment. The figure schematically shows the devices as described with FIG. 3. In the embodiment, the DPP Configurator only supports Wi-Fi band B for configuring an Enrollee that only supports Wi-Fi band A through an AP that supports both bands. Initially, the DPP Configurator configures the AP in the same way as explained above with FIGS. 3-4 and steps 201-206 above. Then, the DPP Configurator additionally configures itself by issuing a Connector for the DPP SSID network on VLAN 2 of the AP and uses this Connector to associate with the DPP SSID network on VLAN 2 of the AP on Wi-Fi band B. The Figure shows that TCP/IP connections are possible through association with DPP SSID on band B, as indicated by an arrow 157.

FIG. 8 shows the result of the further configuration steps. The figure schematically shows the devices as described with FIG. 7. In a next step, the DPP Configurator uses the relay 165 on the operational network, e.g. a DPP over TCP/IP relay on VLAN2, as indicated by an arrow 178. The DPP Enrollee is reached on Wi-Fi band A and configured for the DPP SSID on VLAN2, as indicated by an arrow 179.

FIG. 9 shows the result of the further configuration steps. The figure schematically shows the devices as described with FIG. 8. In a next step, the DPP Enrollee associates with the DPP SSID of the AP. Similar to the end result described with FIG. 6, the association with the DPP SSID makes it possible for the DPP Enrollee to set up TCP/IP connections, as indicated by arrow 158, using IP address/port number combinations reachable on network of the DPP SSID, which usually includes the Internet. Alternatively to the above example, instead of associating with the DPP SSID, the DPP Configurator may use an association with the Configuration SSID to perform the above steps. Optionally, the port number 8908 as specified in the DPP R2 specification [DPP] may be used. However, any other suitable port number may be alternatively selected.

In an embodiment, the configurator is arranged to cooperate with the network access device as described above. According to the configuration protocol the configurator is enabled to configure wireless networks and wireless communication devices to associate with a wireless network. The configurator has the following elements: at least one communication unit arranged to communicate according to a network communication protocol and a processor system. The processor system is arranged to establish, via the communication unit, a configuration network connection according to a network communication protocol such as TCP/IP by association of the configurator to the configuration network. The configurator is further arranged to engage, while cooperating with the network access device via the configuration network, configuration of the operational network, and configuration of a wireless communication device to enable association of the wireless communication device with the operational network.

Optionally, in various embodiments, the configurator may be physically distributed across two or more devices. Such a multi-part configurator may be called a configurator system, or just configurator.

Figure 10:
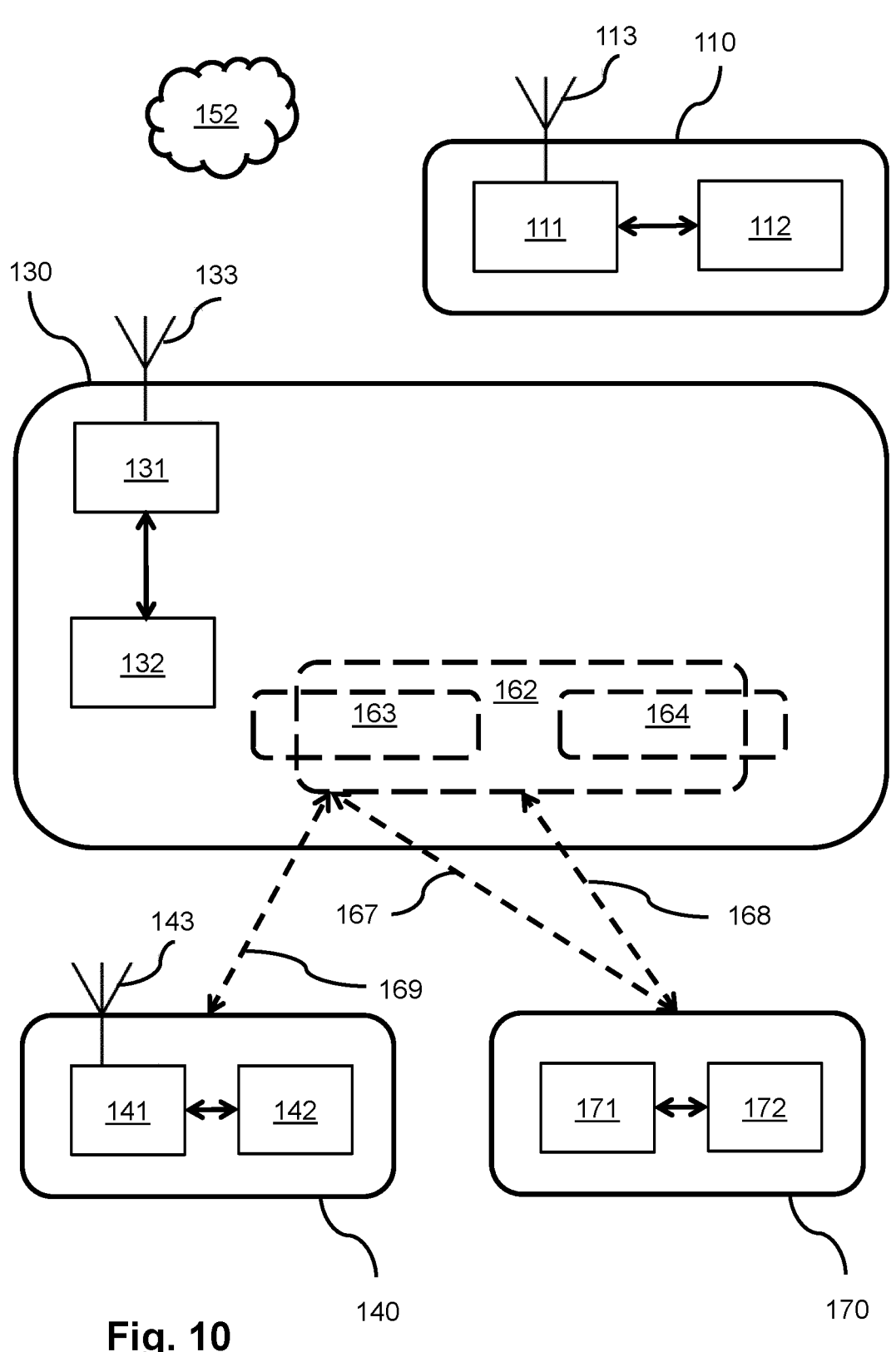
FIG. 10 shows a communication system having a split configurator.

FIG. 10 shows a communication system having a split configurator. The figure shows elements as discussed with FIG. 3. In addition, the configurator functions are now partitioned into a configurator interface 140 and a configurator controller 170, which together may be called a split configurator. The configurator interface has a transceiver unit 141 and a configurator interface processor 142. The configurator controller 170 has a communication unit 171 and a configurator controller processor 172. For communicating between the parts of a split configurator, the configuration protocol may include a configurator interface protocol, for example defining communication between a configurator interface 140 and the configurator controller 170, which may be called remote UI communication. The configurator controller processor 172 may be arranged for at least one of said configuration of the operational network via a device provisioning protocol (DPP) and said configuration of the wireless communication device via a device provisioning protocol (DPP). The split configurator may be arranged to configure the network access device, e.g. a DPP AP.

The Figure schematically shows, by arrow 168 from the configurator controller 170, the configurator controller 170 having a DPP over TCP/IP connection through association with the Configuration SSID network 162. The configurator controller 170 may be coupled via a Wi-Fi connection to the network access device. Alternatively, the configurator controller 170 may be coupled to the network access device via a wired connection, or indirectly via a PC.

The configurator interface processor 142 may be arranged to acquire, using an out-of-band channel, the out-of-band information on the configuration network, and to connect to the configurator controller 170 via the communication unit for enabling the configurator to cooperate with the configurator controller 170 using the out-of-band information. So the DPP Configurator UI may obtain the extended DPP bootstrapping URI of the AP connected to the DPP Controller. The DPP Configurator UI then associates with the Configuration SSID as indicated by arrow 169 and communicates with the configurator controller 170 as indicated by arrow 167. The configurator interface has remote UI communication using TCP/IP over the Configuration SSID network.

Optionally, the out-of-band information may include controller connection information for establishing a controller network connection with the configurator controller 170, and the configurator interface processor is arranged for obtaining the controller connection information from the out-of-band information for said connecting to the configurator controller 170. So, the DPP Configurator UI may find the IP address of the DPP Controller.

Optionally, the DPP Controller may make its IP address for connection 167 available as a service on the AP, e.g. using DNS-based service discovery (DNS-SD), see [RFC 6763], where DNS stands for the Domain Name System, the phonebook of the Internet. The DPP Configurator UI may query this service and find the IP address of the DPP Controller.

In an embodiment of the configurator, the processor system may be arranged to further configure the configuration network into a secure network based on a cryptographic key. Such configuration of a secure network is known as such, and examples are described below. Optionally, the processor system is arranged to obtain the cryptographic key via the out-of-band information, e.g. a QR code. The DPP Configurator UI may set up a secure channel with the DPP Controller based on a public key included in the DPP bootstrapping URI for this purpose.

Figure 11:
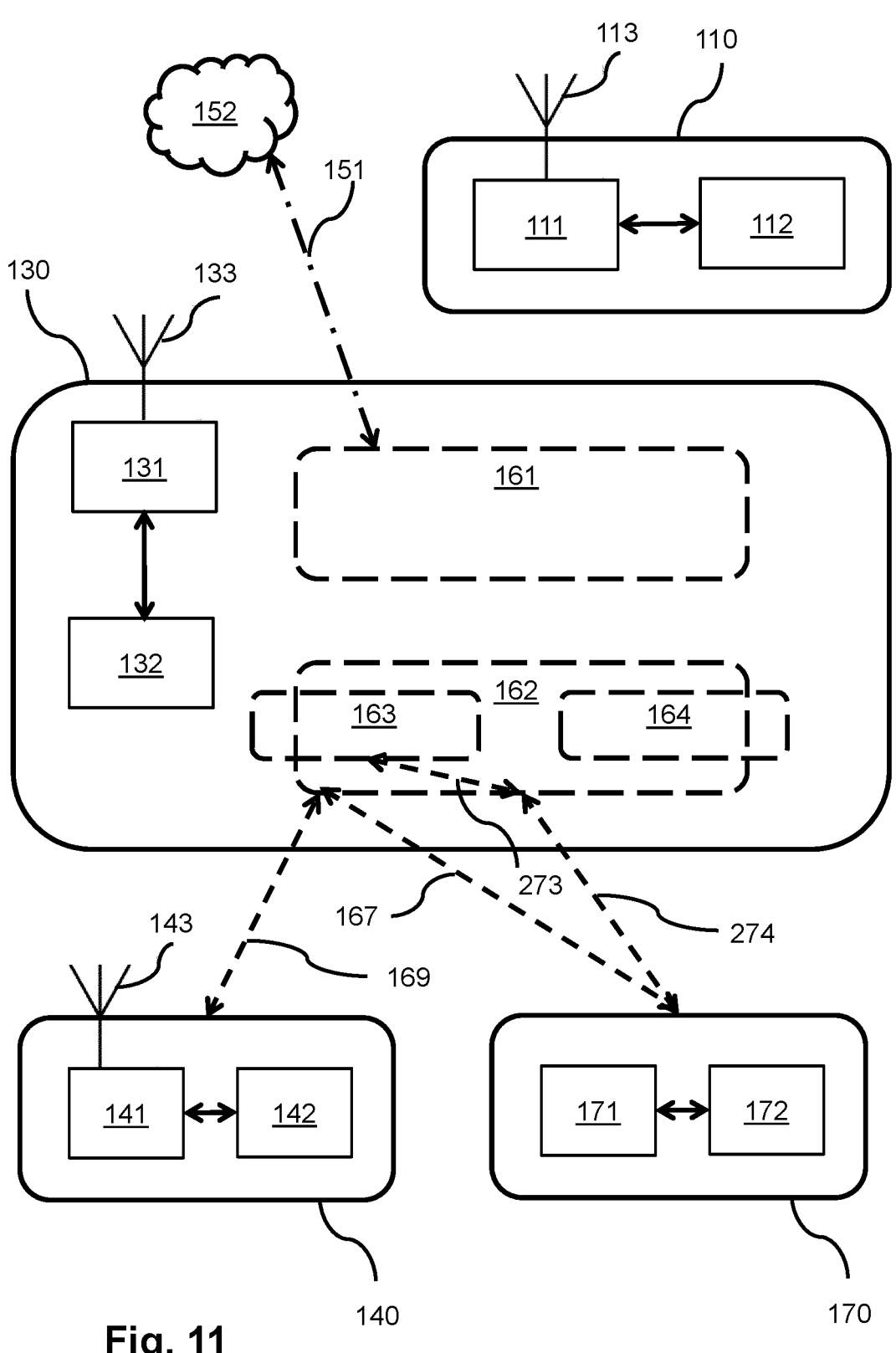
FIG. 11 shows the result of the further configuration steps of a split configurator.

FIG. 11 shows the result of the further configuration steps of a split configurator. The figure shows elements as discussed with FIG. 4 and the configurator functions are partitioned as shown in FIG. 10. The configurator is arranged to cooperate with the network access device as described with FIG. 4 et seq, having a configuration tunnel 163 and, respectively or, a configuration relay 164. The configurator, while cooperating with the network access device, is arranged to accommodate said configuration of the operational network via the configuration tunnel, and, respectively or, said configuration of the wireless communication device via the configuration relay. The Figure schematically shows, by arrow 274 from the configurator controller 170, that TCP/IP connections are possible through association with Configuration SSID. The DPP Configurator UI knows or finds the IP address of the entity 163 in the AP through which the AP can be configured for DPP using DPP over TCP/IP and configures the AP for DPP using DPP over TCP/IP over the configuration SSID, as schematically indicated by arrows 273 and 274.

Figure 12:
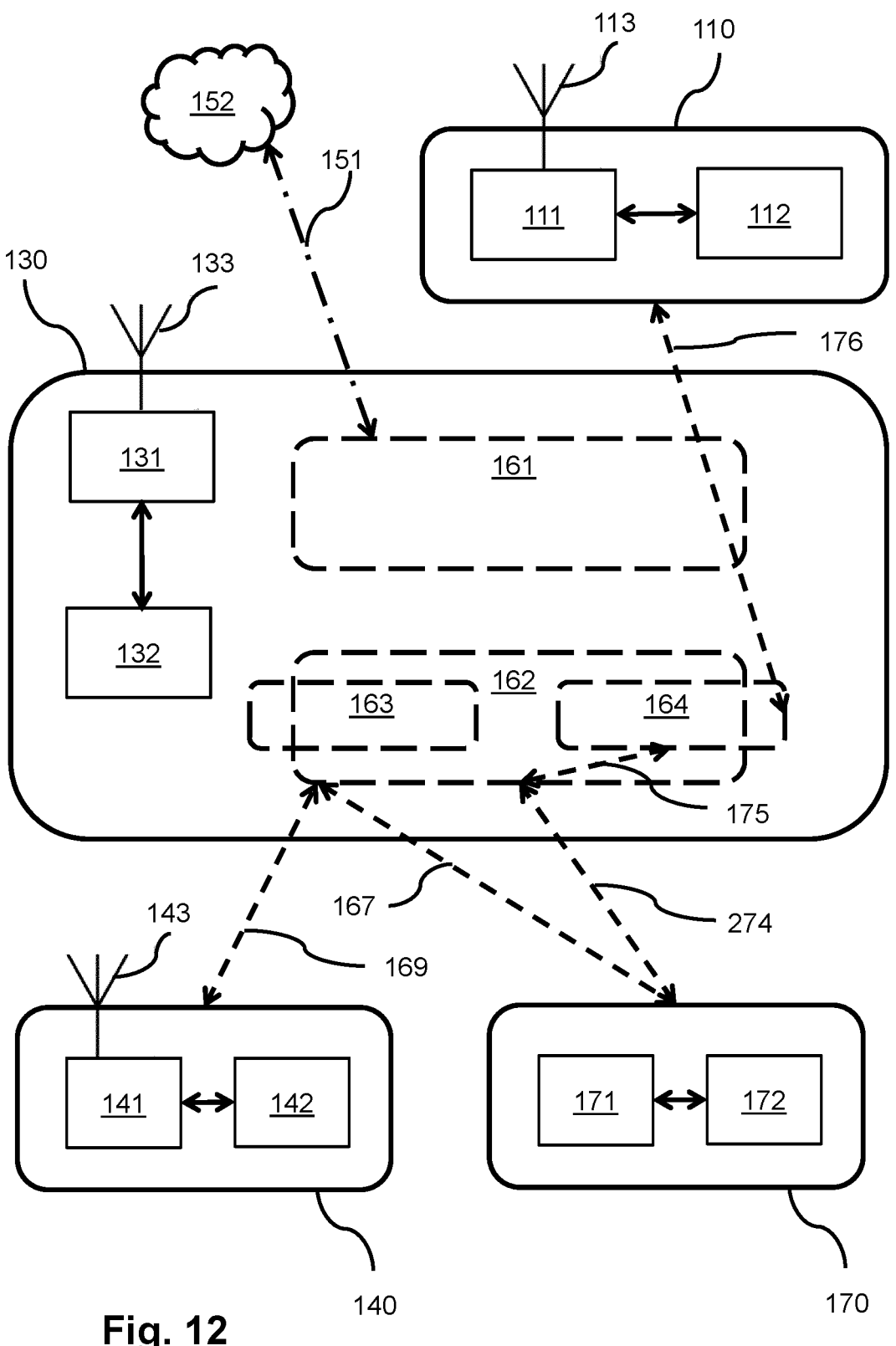
FIG. 12 shows the result of the further configuration steps of a split configurator.

FIG. 12 shows the result of the further configuration steps of a split configurator. The Figure schematically shows the devices as described with FIG. 11 after further configuration steps. The DPP Configurator UI may know or learn the IP address of the DPP over TCP/IP relay as described above. Via the relay 164, the configurator configures the wireless communication device as indicated by arrows 274, 175, 176. First, the DPP Configurator UI bootstraps with a DPP Enrollee via, e.g., capturing a QR code containing the DPP bootstrapping URI of that Enrollee and instructs the DPP Controller to start the DPP protocol with the Enrollee as a Responder via the TCP/IP connection on the configuration SSID of the AP, e.g. using the IP address/port 8908 of the DPP over TCP/IP relay. Then, the DPP Configurator UI instructs the DPP Controller to configure the DPP Enrollee through the DPP over TCP/IP relay of the AP. Optionally, after said configuration, the AP may stop the configuration SSID as described above.

In an embodiment, the configurator controller 170 may support DPP over Wi-Fi. The relay 164 is not required. The configurator controller 170 now may use DPP over Wi-Fi for communicating directly with the AP and configuring the operational network, and for directly configuring the enrollee 110.

Figure 13:
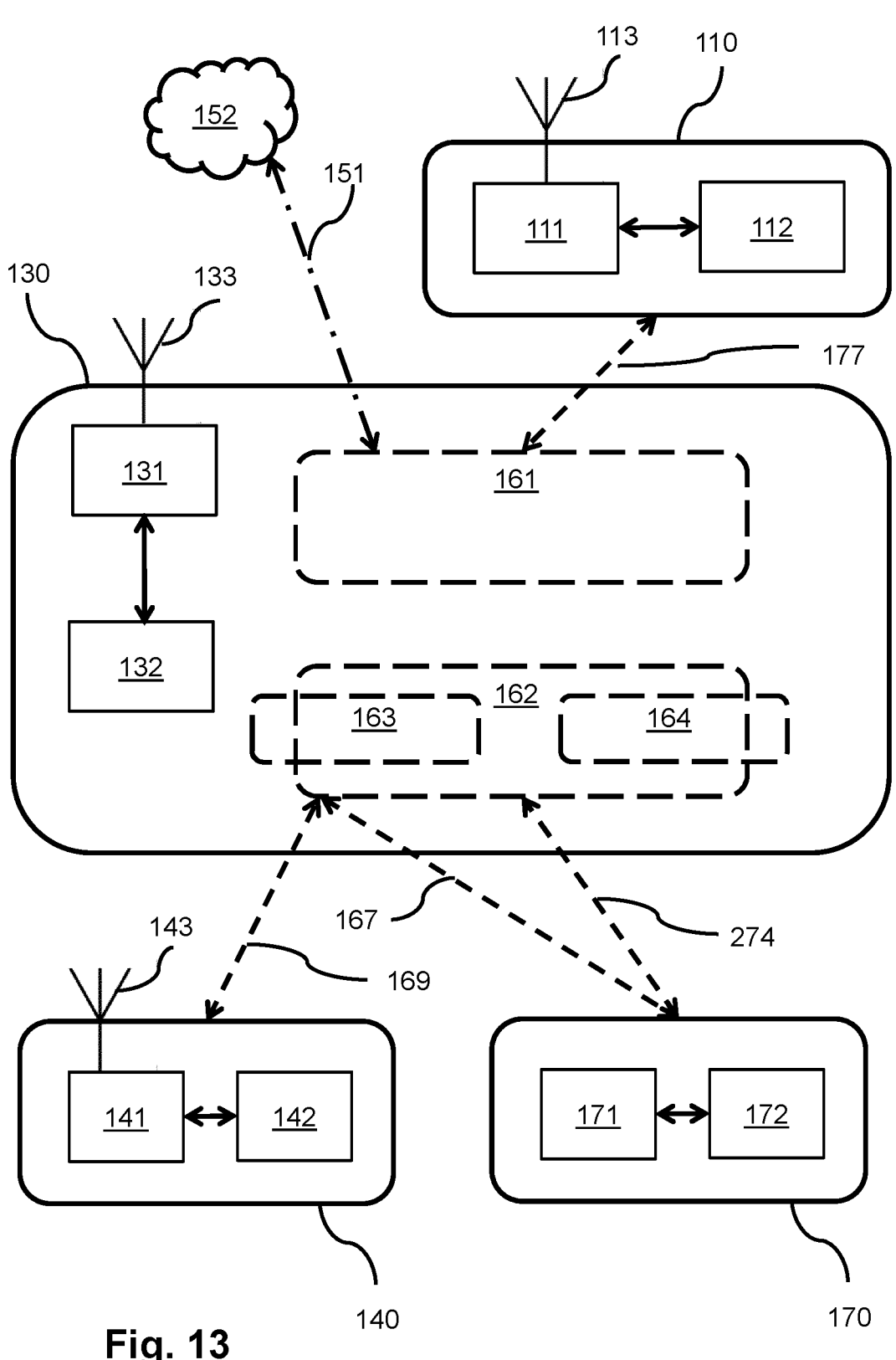
FIG. 13 shows the result of the further configuration steps of a split configurator.

FIG. 13 shows the result of the further configuration steps of a split configurator. The Figure schematically shows the devices as described with FIG. 12 after further configuration steps. As indicated by an arrow 177, the enrollee is now coupled to the operational network 161. So. TCP/IP connections are possible through association with the DPP SSID. The association with the DPP SSID makes it possible for the DPP Enrollee to set up TCP/IP connections with IP address/port number combinations reachable on network of the DPP SSID, which usually includes the Internet.

Figure 14:
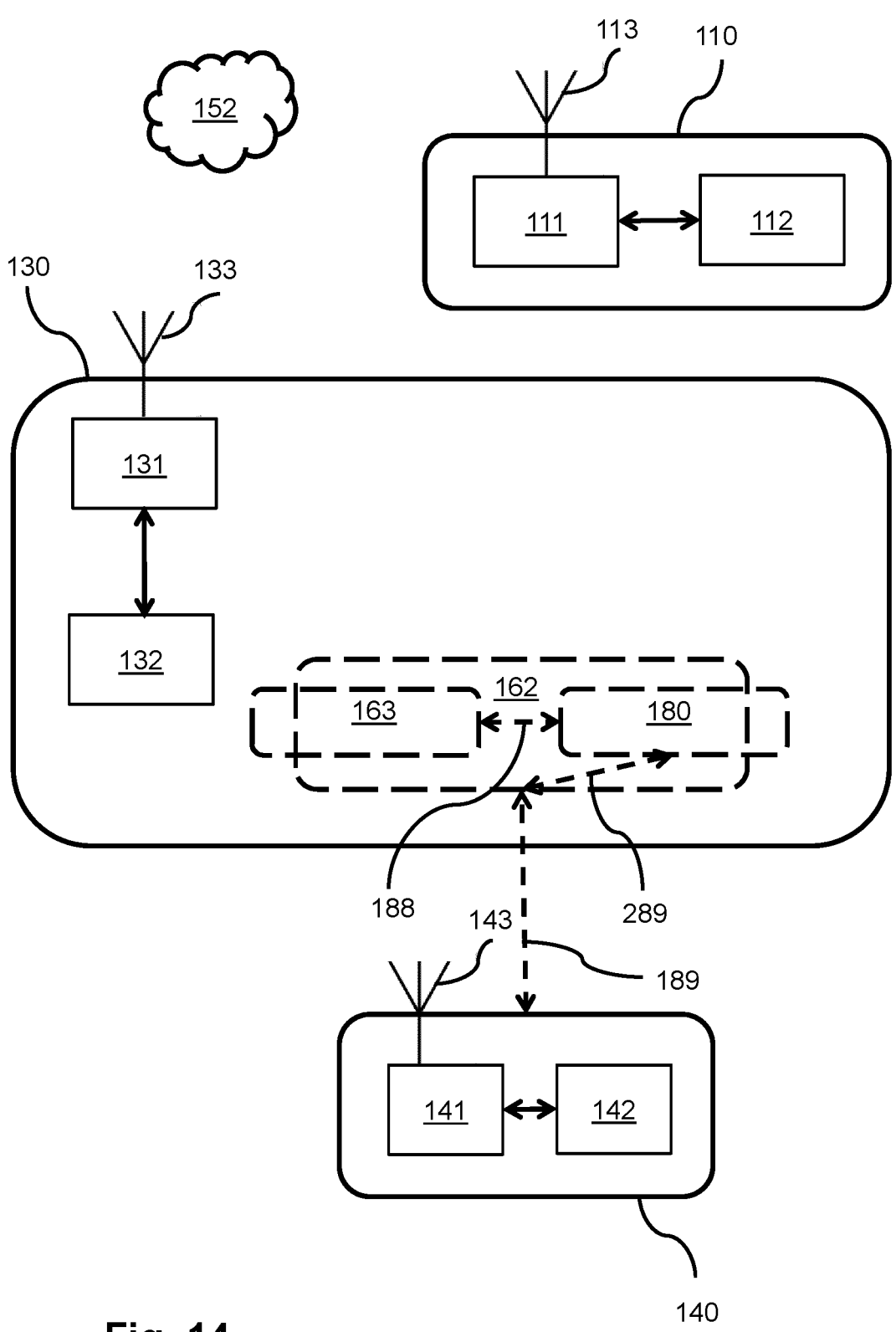
FIG. 14 shows a communication system having a multi-part configurator.

FIG. 14 shows a communication system having a multi-part configurator. The figure shows elements as discussed with FIG. 10. In addition, the configurator functions are now partitioned into a configurator interface 140) and an embedded configurator controller 180 that is embedded in the network access device 130. The configurator interface 140 and the embedded configurator controller 180) may together be called a multi-part configurator. In this case, the configurator controller 180) is not a separate device but is implemented in hardware and/or software of the network access device. The configurator controller 180) may be implemented on a processor of the network access device acting as configurator controller processor, for performing at least one of said configuration of the operational network via a device provisioning protocol (DPP) and said configuration of the wireless communication device via a device provisioning protocol (DPP). The Figure schematically shows, by arrow 188 from the embedded configurator controller 180), that internal connections to a configuration port 163 enable said configuration via the device provisioning protocol, e.g. DPP over TCP/IP. As indicated by arrows 189 and 289, the configurator interface 140 has remote UI communication using TCP/IP over the Configuration SSID network with the embedded configurator controller 180.

Figure 15:
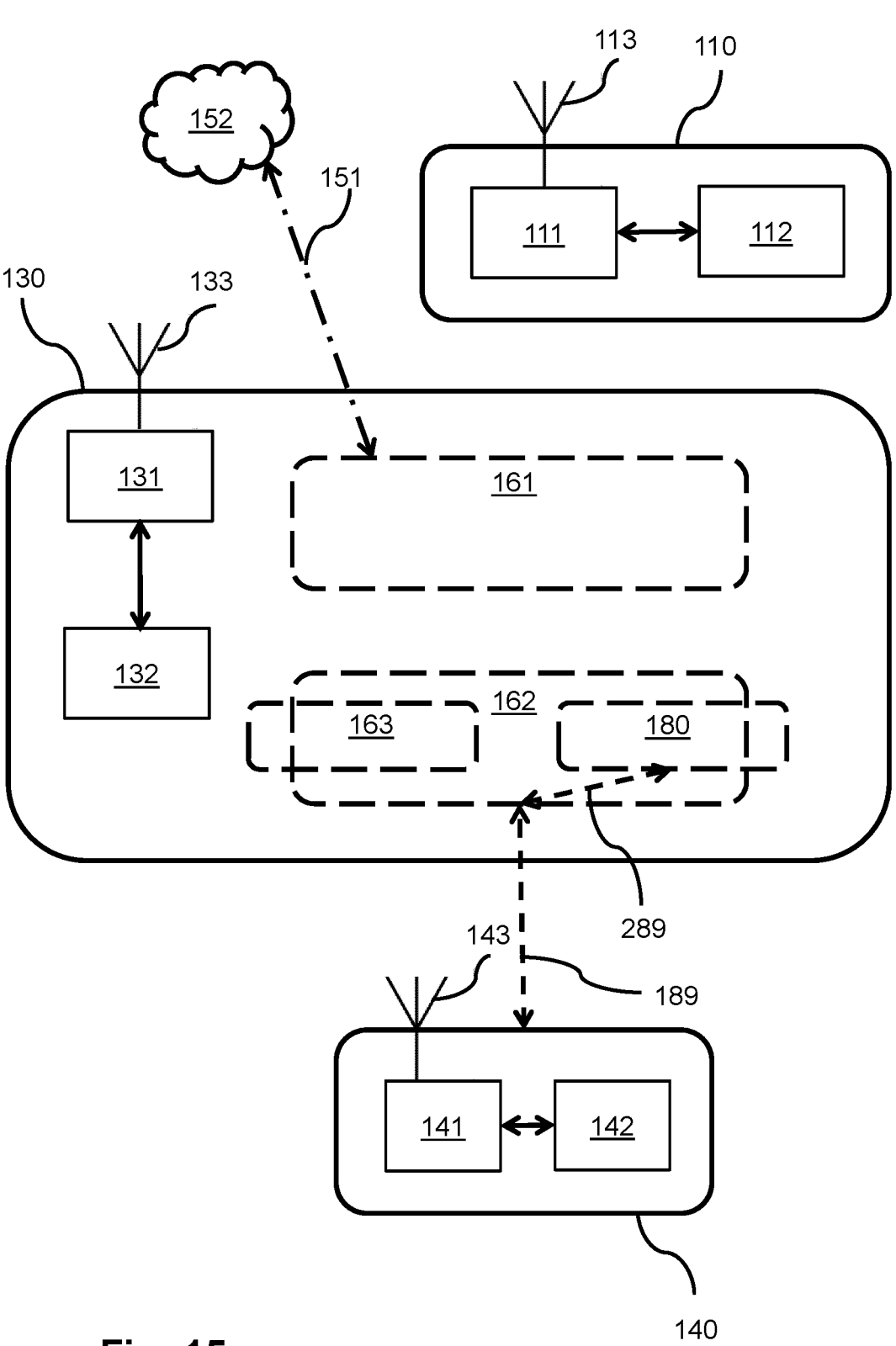
FIG. 15 shows the result of the further configuration steps of a multi-part configurator.

FIG. 15 shows the result of the further configuration steps of a multi-part configurator. The Figure schematically shows the devices as described with FIG. 14, where the configurator controller 180 is embedded in the network access device. The multi-part configurator has configured the operational network 161 via DPP, also called the DDP SSID. The DPP Controller 180 may know addresses directly because of the co-location in the network access device. For example, the DPP Controller does not have to learn the IP address of the DPP over TCP relay on the Configuration SSID since they are co-located in the same device, the AP.

Figure 16:
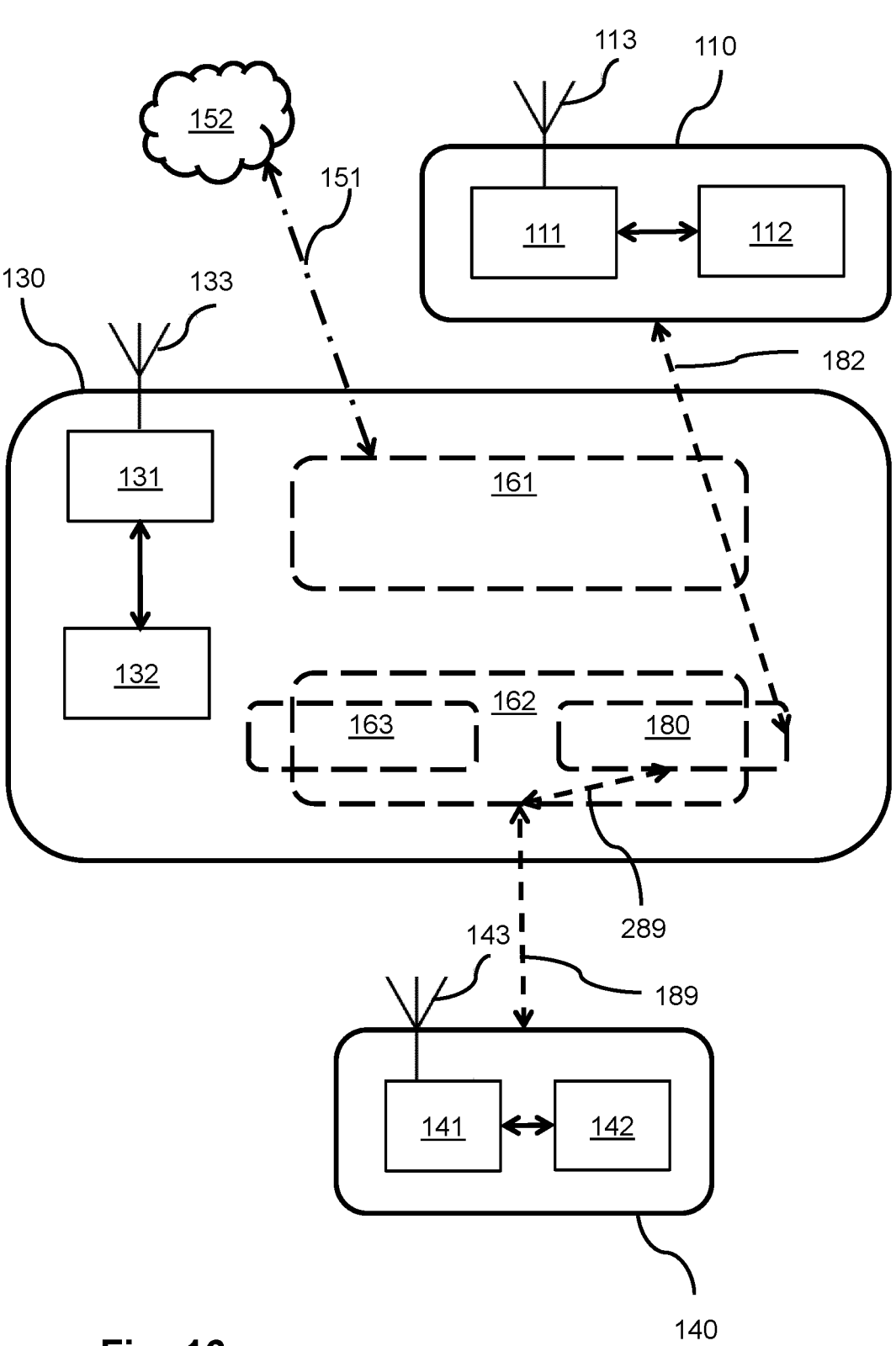
FIG. 16 shows the result of the further configuration steps of a multi-part configurator.

FIG. 16 shows the result of the further configuration steps of a multi-part configurator. The Figure schematically shows the devices as described with FIG. 15. As indicated by arrows 189 and 289, the configurator interface 140 has remote UI communication using TCP/IP over the Configuration SSID network with the embedded configurator controller 180. As indicated by arrow 182, the enrollee 110 is being configured using DPP over Wi-Fi.

Figure 17:
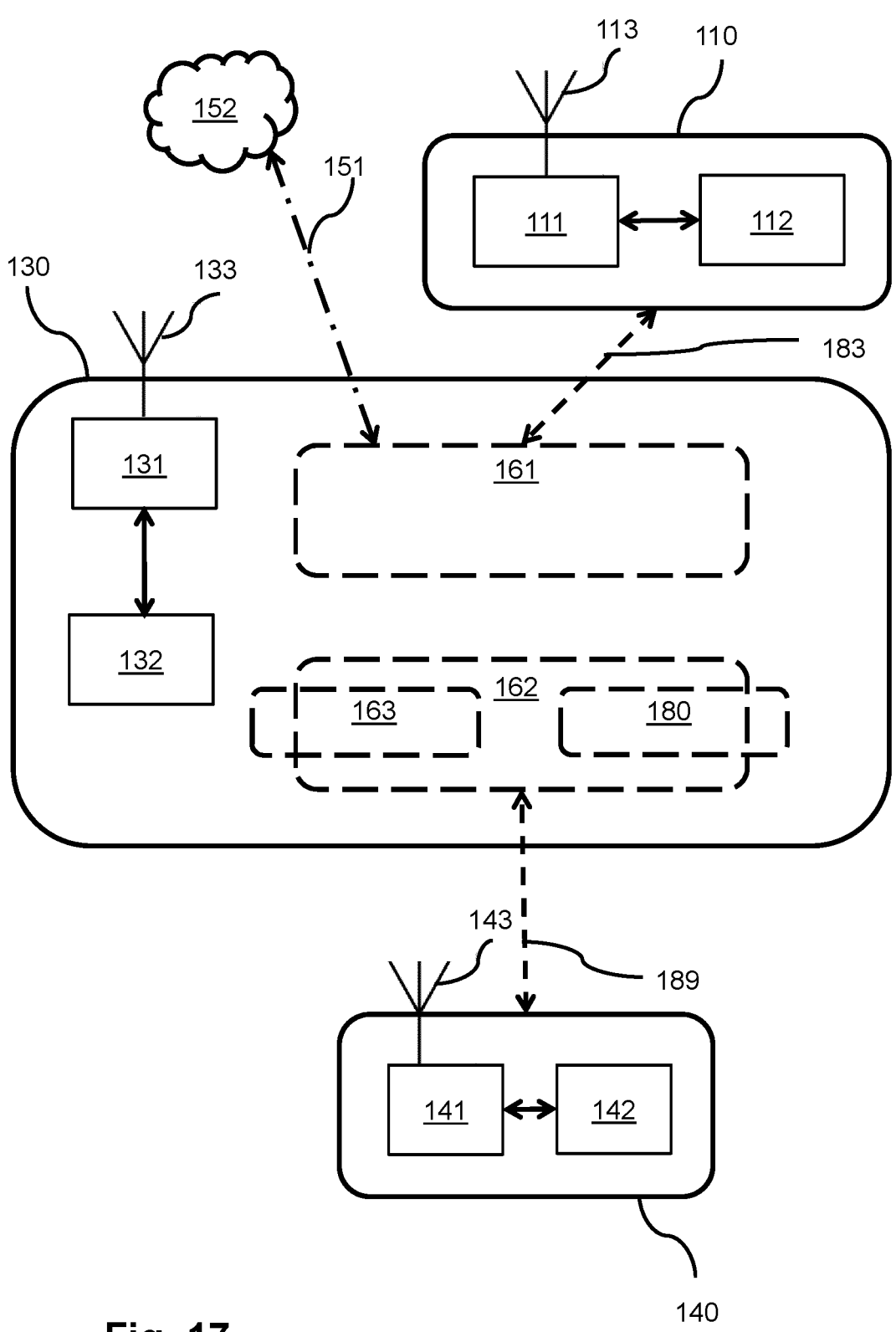
FIG. 17 shows the result of the further configuration steps of a multi-part configurator.

FIG. 17 shows the result of the further configuration steps of a multi-part configurator. The Figure schematically shows the devices as described with FIG. 16. The multi-part configurator has now configured the DPP Enrollee 110. As indicated by an arrow 183, the enrollee has TCP/IP connections available through association with DPP SSID.

In this document, a smartphone used to act as the configurator may be a traditional smartphone or other computing device that is not able to transmit and receive the special Wi-Fi DPP frames, the 802.11 Public Action frames and vendor specific Generic Advertisement Service (GAS) Public Action frames as specified in the DPP specification [DPP]. In a multi-part implementation, a traditional smartphone may act as the configurator interface, which provides a user interface (UI) and camera for the configurator. In the examples such a device may be called a DPP Configurator UI, while the configurator controller may be called DPP Controller.

A smart phone may execute part of the configurator functions related to interfacing with the user, which part is called a configurator interface. Further tasks of the configurator may be implemented in one or more different physical devices, which together may be called a configurator controller. Such a configurator controller may be a separate device, e.g. coupled to a PC, or may be implemented in software and/or hardware of a PC or laptop. Also, a smart phone may perform the functions of the configurator controller and of the configurator device 120 as described in relation with FIGS. 3, 4, 5, 6, 7, 8 and 9.

Moreover, the functionality to transmit and receive the special Wi-Fi DPP frames and some other functions, like storing private DPP Configurator keys, may reside in a device like a Wi-Fi AP. Such devices usually use Linux as an operating system and e.g. Linux allows user programs to access the Wi-Fi functionality to create, transmit and receive the special Wi-Fi DPP frames. However, these devices are usually boxes that are put away in a closet or are attached to the ceiling and therefor lack a good user interface (UI). In addition, they usually do not have a camera. We may call such a DPP Configurator without UI and camera a DPP Controller in this application.

The DPP Controller part of the DPP Configurator may or may not be co-located in the AP. In the implementation where the DPP Controller is co-located with the AP, the DPP over TCP/IP relay on the Configuration SSID is not necessary, since the DPP Controller can directly transmit and receive the special Wi-Fi frames defined for DPP, see [DPP], using the Wi-Fi transceiver of the AP. Also in the implementation where the DPP Controller is co-located with the AP, the IP address/port number of the function to configure the AP itself does not have to be made available on the Configuration SSID, since the DP Controller is co-located with this function and any interface between them may be implemented.

In a multi-part configurator, a DPP Configurator UI and a DPP Controller may have to connect so they can communicate, which may require an IP connection. Most convenient for the user of course is a wireless connection. When performing Wi-Fi network configuration, a straightforward wireless connection is a Wi-Fi connection.

Furthermore, the configurator interface device may have the function to configure a new AP. Similarly to the above examples, having most DPP Configurator functionality implemented in a traditional smart phone, the AP may set up a Configuration SSID for this initial configuration. The DPP Configurator UI can obtain the Configurator SSID in the same way, e.g. from the DPP Bootstrapping URI that the DPP Configurator UI can capture with its camera, through NFC or through any of the other methods described in this document and in [DPP]. The DPP Configurator UI can lean the IP address of the DPP Controller on the Configuration SSID in any of the ways described for the previous implementation, e.g. by DNS-based service discovery (DNS-SD), see [RFC 6763].

However, a DPP Configurator UI may find more than one Configuration SSID and/or more than one DPP Controller. This may pose a problem when the name (SSID) of the Configuration SSID for many APs is a standard name for a certain AP brand or when the name (SSID) of the Configuration SSID is not found through the bootstrapping URI. This may lead to the situation that a DPP Configurator UI connects to the wrong DPP Controller, e.g. the DPP Controller belonging to a neighbor and that the user accidentally configures his DPP Enrollee to become part of the network of that neighbor. Both the user and the neighbor will not like it that this can happen. Therefore, both the (user of the) DPP Controller UI and the DPP Controller need to make sure that they communicate with the right device.

Connecting the configurator interface to the intended configurator controller may be achieved similar to the DPP Authentication protocol, using a configurator interface protocol. One of the devices, e.g. the DPP Controller residing in the AP, makes a public key available, e.g. its public DPP Bootstrapping key, in an out-of-band (OOB) fashion, so e.g. in a QR code. NFC message, etc., but not over Wi-Fi The other device, in this example the DPP Configurator UI, captures this public key, starts a protocol very similar to the DPP Authentication protocol in which the DPP Controller has to prove that it possesses the private key that belongs to the public key that has been made available in OOB fashion. When that has been proven successfully, the two devices can derive a symmetric key with which they can set-up a secure channel. This key can be derived in similar fashion as the key 'ke' at the end of the DPP Authentication protocol. The public key to use can be the same as the public bootstrapping key of the DPP Controller, but for good crypto-hygiene, it may be better to use a separate public key especially for setting up this secure channel. Thereto the DPP bootstrapping URI may be extended with an extra public key.

Once this secure channel has been set-up, the DPP Configurator UI and the DPP Controller can be thought of as one configurator, e.g. a DPP Configurator, while the DPP Configurator UI can be used to configure the AP with a DPP network and DPP Enrollees for enrollment in the DPP network.

Devices that do not support the specific Wi-Fi frames needed for "DPP over Wi-Fi" may support "DPP over TCP/IP" in order to become configured for a Wi-Fi network, since the latter requires a TCP/IP connection. We call these devices "DPP over TCP/IP Enrollees" in the disclosure. At present, these devices are typically smart devices and thus deploy one of the major operating systems and therefore may very well support a UI and a camera or NFC reader capable of performing DPP bootstrapping. In the rest of this disclosure, it is assumed that these DPP over TCP/IP Enrollees support QR-code. NFC or any other bootstrapping using the extended bootstrapping URI as described above and that they support a suitable UI.

There is a problem in that these DPP over TCP/IP Enrollees are not arranged to be configured for a DPP-only (operational) network, since associating with a DPP-only network requires that a device sends its DPP Connector to the DPP AP using the DPP Network Introduction protocol as specified in section 6.6 of [DPP]. The DPP Network Introduction protocol uses specific Wi-Frames that a DPP over TCP/IP Enrollee may not support. However, associating to the operational network 161 is possible for DPP over TCP/IP Enrollees in case the operational network 161 is configured, using any of the above described ways, as a network that at least supports e.g. a PSK (Pre-shared Key, see [802.11]) or SAE (Simultaneous Authentication of Equals, see [WPA3]). This can be implemented by specifying a e.g. dpp+sac, or dpp+psk+sac AKM (Authentication and Key Management) suite selector in the DPP Configuration object that the DPP Configurator sends to the Enrollee during configuration, see section 4.5 of [DPP]. The sequence of steps is now the following.

The operational network 161 of the network access device 130 is configured according to any of the above described methods, such that Wi-Fi devices can also associate with the operational network 161 on the network access device 130 using a PSK (Pre-shared Key) and/or SAE (Simultaneous Authentication of Equals) and or Enterprise credentials, see section 4.3.5.9 of [DPP].

The configurator device 120 or the configurator interface 140, when somehow instructed to perform the configuration of a DPP over TCP/IP Enrollee (not shown), creates a DPP bootstrapping URI, extended with the SSID of the configuration network 162, which the configurator device 120 or the configurator interface 140 knows from the previous steps, and the IP address of its DPP over TCP/IP port in case of the configurator device 120. In case of a configurator interface 140, the DPP over TCP/IP port in the extended DPP bootstrapping URI is that of the configurator controller 170. The port number of this port may be the one specified in [DPP], or it may also be included in the extended DPP bootstrapping URI. The configurator device 120 or the configurator interface 140 shows the extended DPP bootstrapping URI on their display or makes it available over NFC, or makes it available in any other manner, e.g. over Bluetooth. In the case where the configurator controller is embedded, the URI is that of the embedded configurator controller 190. It may be understood that the Enrollee associates with the configuration network 162.

The DPP over TCP/IP Enrollee obtains the QR-code containing the extended DPP bootstrapping URI of the configurator device 120 or the configurator interface 140, e.g. by scanning the QR-code or by reading the extended DPP bootstrapping URI of the configurator device 120 or the configurator interface 140 using NFC or in any other suitable manner. The DPP over TCP/IP Enrollee extracts the SSID of the configuration network 162 from the obtained extended bootstrapping URI and associates with the configuration network 162.

Next, the DPP over TCP/IP Enrollee extracts the DPP Bootstrapping key and the DPP over TCP/IP port information of the configurator device 120 or the configurator interface 140 from the DPP bootstrapping URI and starts the DPP Authentication protocol as Initiator with the configurator device 120 or the configurator interface 140 using DPP over TCP/IP as specified in [DPP].

After successful DPP Authentication, the configurator device 120 or the configurator interface 140 starts the DPP Configuration protocol and configures the DPP over TCP/IP Enrollee (not shown) for the operational network 161 with a DPP Configuration object containing at least a PSK AKM and/or SAE AKM suite selector including the corresponding PSK and/or WPA2 or SAE passphrase, see [DPP]. It may be understood that that the PSK AKM and the corresponding PSK on one hand and the SAE AKM and SAE passphrase on the other hand, may be sent at different times.

After successful configuration, the DPP over TCP/IP Enrollee (not shown) associates with the operational network 161 using the AKM suite selector information in the DPP Configuration object it received during the DPP Configuration protocol. This may require that the DPP over TCP/IP Enrollee (not shown) disassociates with the configuration network 162.

A first variation of configuring a DPP over TCP/IP Enrollee (not shown) is the following.

The operational network 161 of the network access device 130 is configured according to any of the above described methods, such that Wi-Fi devices can also associate with the operational 30) network 161 on the network access device 130 using a PSK (Pre-shared Key) and/or SAE (Simultaneous Authentication of Equals).

The DPP over TCP/IP Enrollee (not shown) searches for open networks, e.g. Wi-Fi Enhanced Open [WiFi_EO] networks, or legacy networks without encryption, and associates with one of these. Note that the selected network may be a different one than the configuration network 162.

The DPP over TCP/IP Enrollee (not shown) creates a DPP bootstrapping URI, extended with the SSID of the open network it associated with and the IP address of its DPP over TCP/IP port. The port number of this port may be the one specified in [DPP], or it may also be included in the extended DPP bootstrapping URI.

The DPP over TCP/IP Enrollee (not shown) shows the newly created DPP bootstrapping URI as an extended DPP bootstrapping QR-code or makes this URI available using NFC or any other suitable manner.

The configurator device 120 obtains the extended bootstrapping URI of the DPP over TCP/IP Enrollee (not shown) using a camera or NFC reader and extracts the SSID with which the DPP over TCP/IP Enrollee (not shown) has associated with and the information of the DPP over TCP/IP port of the DPP over TCP/IP Enrollee (not shown).

The configurator device 120 associates with the SSID with which the DPP over TCP/IP Enrollee (not shown) has associated.

The configurator device 120 starts the DPP Authentication protocol as Initiator with the DPP over TCP/IP Enrollee (not shown) using the information of the DPP over TCP/IP port of the DPP over TCP/IP Enrollee (not shown).

After successful DPP Authentication, the configurator device 120 starts the DPP Configuration protocol and configures the DPP over TCP/IP Enrollee (not shown) for the operational network 161 with a DPP Configuration object containing at least a PSK AKM and/or SAE AKM suite selector including the corresponding PSK itself and/or WPA2 or SAE passphrase, see [DPP].

After successful configuration, the DPP over TCP/IP Enrollee (not shown) associates with the operational network 161 using the AKM suite selector information in the DPP Configuration object it received during the DPP Configuration protocol. This may require that the DPP over TCP/IP Enrollee (not shown) disassociates with the open network it associated with before.

The first variation of configuring a DPP over TCP/IP Enrollee (not shown) as described above can also be made to work for the combination of a configurator interface 140 and configurator controller 170. A second variation of configuring a DPP over TCP/IP Enrollee (not shown) is based on the above described first variation, and uses the combination of a configurator interface 140 and configurator controller 170 instead of the configurator device 120 In that case, after obtaining the extended bootstrapping URI of the DPP over TCP/IP Enrollee (not shown), the configurator interface 140 instructs the configurator controller 170 over link 167 and 169 to associate with the network indicated by the SSID in the extended bootstrapping URI of the DPP over TCP/IP Enrollee (not shown). After the configurator controller 170 has associated with this network, it may make its IP address and possibly port number on this network available to the configurator interface 140 using e.g. DNS-based service discovery (DNS-SD) or any other suitable means.

After the configurator interface 140 has associated with the SSID with which the DPP over TCP/IP Enrollee (not shown) has associated and has obtained the IP address/port number of the configurator controller 170, the configurator interface 140 continues with configuring the DPP over TCP/IP Enrollee (not shown) and the DPP over TCP/IP Enrollee (not shown) associates with the operational network 161 as described in the above first variation.

A third variation of configuring a DPP over TCP/IP Enrollee (not shown) is the following.

The operational network 161 of the network access device 130 is configured according to any of the above described methods, such that Wi-Fi devices can also associate with the operational network 161 on the network access device 130 using a PSK (Pre-shared Key) and/or SAE (Simultaneous Authentication of Equals).

The DPP over TCP/IP Enrollee (not shown) searches for the configuration network 162 and associates with this. The DPP over TCP/IP Enrollee (not shown) may find the configuration network 162 by examining all open networks in RF range and querying using e.g. DNS-based service discovery (DNS-SD) for the DPP configuration service by a configurator device 120 or the configurator interface 140. Alternatively, the user of the DPP over TCP/IP Enrollee (not shown) may instruct the DPP over TCP/IP Enrollee (not shown) to associate with the configuration network 162 or has the DPP over TCP/IP Enrollee (not shown) obtain information on the (SSID of the) configuration network 162 using a camera. NFC reader. Bluetooth or any other suitable means.

The DPP over TCP/IP Enrollee (not shown) creates a DPP bootstrapping URI, extended with the IP address of its DPP over TCP/IP port. The port number of this port may be the one specified in [DPP], or it may also be included in the extended DPP bootstrapping URI. The DPP bootstrapping URI may be further extended with the SSID of the configuration network 162.

The DPP over TCP/IP Enrollee (not shown) shows the newly created DPP bootstrapping URI as an extended DPP bootstrapping QR-code or makes this URI available using NFC or any other suitable manner.

The configurator device 120 or the configurator interface 140 obtains the extended bootstrapping URI of the DPP over TCP/IP Enrollee (not shown) using a camera or NFC reader and extracts the information of the DPP over TCP/IP port of the DPP over TCP/IP Enrollee (not shown) and may extract the SSID. In case the SSID is present, the configurator device 120 or the configurator interface 140 check whether this SSID is indeed that of the configuration network 162. If it is not the same, the operation is aborted, or the configurator device 120 or the configurator interface 140 proceed as in the second variation of configuring a DPP over TCP/IP Enrollee (not shown).

The configurator device 120 or the configurator interface 140 starts the DPP Authentication protocol as Initiator with the DPP over TCP/IP Enrollee (not shown) using the information of the DPP over TCP/IP port of the DPP over TCP/IP Enrollee (not shown).

After successful DPP Authentication, the configurator device 120 or the configurator interface 140 starts the DPP Configuration protocol and configures the DPP over TCP/IP Enrollee (not shown) for the operational network 161 with a DPP Configuration object containing at least a PSK AKM and/or SAE AKM suite selector including the corresponding PSK itself and/or WPA2 or SAE passphrase, see [DPP].

After successful configuration, the DPP over TCP/IP Enrollee (not shown) associates with the operational network 161 using the AKM suite selector information in the DPP Configuration object it received during the DPP Configuration protocol. This may require that the DPP over TCP/IP Enrollee (not shown) disassociates with the configuration network 162.

It may be convenient that the configuration network have an open SSID. This has the advantage that an enrollee which does support DPP over TCP/IP may associate this this network automatically and wait for communication from the configurator device.

The above embodiments have been described using devices. However, the various protocols, messages and processor actions may be executed by corresponding method steps, which can easily be derived from the above description. The methods may be executed, for example, by circuitry and software in the processor or a Wi-Fi controller. Many different ways of implementing the methods are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above methods, configuration processes and further operations when executed on a computer device. So, the methods according to the invention may be executed using software, which comprises instructions for causing a processor system to perform the respective method.

FIG. 18a shows a computer readable medium 1000 having a writable part 1010 comprising a computer program 1020, the computer program 1020 comprising instructions for causing a processor system to perform one or more of the above methods in the system as described with reference to FIGS. 1-17. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Typically, devices that execute the above process, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog. VHDL etc.

FIG. 18*b* shows in a schematic representation of a processor system 1100 according to an embodiment of the network access device, configurator, or configurator interface or configurator controller as described with reference to FIGS. 1-17. The processor system may be embodied by one or more circuits 1110, e.g. each comprising one or more integrated circuits. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., a transceiver with an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the methods according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, this application relates to devices and methods for configuration of wireless networks. A network access device is arranged to cooperate with a configurator according to a configuration protocol (DPP) that enables to configure wireless networks and wireless devices. The network access device has a transceiver for wireless communication (Wi-Fi), and a processor arranged to accommodate an operational network arranged to enable access to an external network using a network communication protocol (TCP/IP), and a configuration network arranged not to provide access to the external network after configuration of the operational network. The network access device provides out-of-band information on the configuration network for enabling the configurator to cooperate with the network access device, and accommodates, while cooperating with the configurator via the configuration network, configuration of the operational network, and configuration of the wireless communication device to enable association of the wireless communication device with the operational network.

REFERENCED DOCUMENTS

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016.

[802.1Q] IEEE Standard for Local and metropolitan area networks—Bridges and Bridged Networks, 2014.

[DPP] Device Provisioning Protocol—Technical Specification—Version 2.0, Wi-Fi Alliance, 2020, (https://www.wi-fi.org/downloads-public/Wi-Fi_Easy_Connect_Specification_v2.0.pdf/35330)

[RFC 6763] RFC 6763, DNS-Based Service Discovery, February 2013, https://datatracker.ietf.org/doc/rfc6763.

[WiFi_EO] Opportunistic Wireless Encryption Specification, Version 1.1, Wi-Fi Alliance, 2020, (https://www.wi-fi.org/file-member/opportunistic-wireless-encryption-specification)

[WPA3] WPA3™ Specification, Version 3.0, Dec. 14, 2020, Wi-Fi Alliance.

The invention claimed is:

1. A network access device for providing wireless networks, the device being arranged to cooperate with a configurator according to a configuration protocol that enables configuring of a wireless network and a wireless communication device to associate with the wireless network, the network access device comprising:

a transceiver for wireless communication with the wireless communication device of a wireless communication protocol, and a processor configured to:

accommodate a first wireless network as an operational network, the operational network being arranged to enable access to an external network using a network communication protocol;

accommodate a second wireless network as a configuration network arranged not to provide access to the external network after configuration of the operational network;

enable establishing a configuration network connection according to the network communication protocol by association of the configurator to the configuration network;

the network access device being arranged to:

provide, using an out-of-band channel, out-of-band information on the configuration network for enabling the configurator to cooperate with the network access device, accommodate, while cooperating with the configurator via the configuration network, configuration of the operational network, and configuration of the wireless communication device to enable association of the wireless communication device with the operational network, provide, on the configuration network:

a configuration tunnel, the tunnel enabling messages according to the configuration protocol to be transferred via the configuration network connection (DPP over TCP/IP), and a configuration relay arranged for relaying, via the configuration network connection, configuration messages according to the configuration protocol using the wireless communication protocol (DPP over Wi-Fi); and the network access device being further arranged to accommodate the configuration of the operational network via the configuration tunnel, and/or the configuration of the wireless communication device via the configuration relay.

2. The device of claim 1 wherein the configuration network is arranged to have an open SSID.

3. The device of claim 1, wherein the out-of-band information comprises at least one of:

a configuration network identifier for the association of the configurator to the configuration network;

relay information for accessing the configuration relay including a relay port address according to the network communication protocol;

tunnel information for accessing the configuration tunnel including a tunnel port address according to the network communication protocol.

4. The device of claim 1, wherein the processor is arranged to separate the operational network and the configuration network by creating at least one of:

a first virtual local area network on the operational network and a second virtual local area network on the configuration network.

5. The device of claim 1, wherein at least one of the network communication protocol is the transmission control protocol/internet protocol TCP/IP, the wireless communication protocol is Wi-Fi, the configuration protocol is the device provisioning protocol DPP, the tunnel enables transfer of DPP messages over TCP/IP, and the relay converts DPP messages over Wi-Fi into DPP messages over TCP/IP and vice versa.

6. The device of claim 1 wherein the device is arranged to support at least one of Pre-Shared Keys, Simultaneous Authentication of Equals and Enterprise credentials.

7. The device of claim 1, wherein the device comprises a DPP controller and the DPP controller is arranged to provide its IP address for connection as a service.

8. The device of claim 1, wherein the configurator is arranged to cooperate with the network access device according to a configuration protocol that enables the configurator to configure wireless networks and wireless communication devices to associate with a wireless network, the configurator comprising:

a communication unit arranged to communicate according to a network communication protocol; and a processor system arranged to establish, via the communication unit, a configuration network connection according to a network communication protocol by association of the configurator to the configuration network, the configurator being arranged to engage, while cooperating with the network access device via the configuration network, configuration of the operational network, and configuration of a wireless communication device to enable association of the wireless communication device with the operational network.

9. The device of claim 8, wherein the configurator comprises a configurator controller and the configuration protocol comprises a configurator interface protocol defining communication between a configurator interface and the configurator controller, wherein the configurator controller comprising a processor is configured to:

configure the operational network via a device provisioning protocol, and/or configure the wireless communication device via a device provisioning protocol.

10. The device of claim 8, wherein the configurator comprises a configurator interface and the configuration protocol comprises a configurator interface protocol defining communication between the configurator interface and a configurator controller, the configurator interface comprising a configurator interface processor arranged to acquire, using an out-of-band channel, the out-of-band information on the configuration network, and to connect to the configurator controller via the communication unit for enabling the configurator to cooperate with the configurator controller using the out-of-band information.

11. The device of claim 8, wherein the configurator is arranged to send, in a configuration message to an Enrollee, an indication of a selection of a type of authentication and key management suite and at least one of a Pre-Shared Key and a passphrase for use by the Enrollee to associate with the operation network.

12. The device of claim 8, wherein the configurator is arranged to provide an indication of a TCP port in a message to the network access device.

13. A wireless communication device for communicating in wireless networks, the device being arranged to cooperate with a configurator according to a configuration protocol, wherein the configuration protocol enables configuration of wireless networks and wireless communication devices to associate with a wireless network comprising a network access, the wireless communication device comprising:

a transceiver for wireless communication with a network access device for providing wireless networks according to a wireless communication protocol, and a processor arranged to: receive a configuration from the configurator to associate with a first wireless network as an operational network, the operational network being arranged to enable access to an external network using a network communication protocol, wherein the operational network comprises:

a configuration tunnel, the tunnel enabling messages according to the configuration protocol to be transferred via the configuration network connection (DPP over TCP/IP), and a configuration relay arranged for relaying, via the configuration network connection, configuration messages according to the configuration protocol using the wireless communication protocol (DPP over Wi-Fi); and the network access device being further arranged to accommodate the configuration of the operational network via the configuration tunnel, and/or the configuration of the wireless communication device via the configuration relay, and wherein the configuration protocol includes steps to:

associate with a configuration network connection, according to the network communication protocol wherein the wireless communication device is arranged to:

communicate with the configuration network and/or the configurator using TCP/IP, provide or to obtain, using an out-of-band channel, out-of-band information on the configuration network for enabling the configurator to cooperate with the wireless communication device, and accommodate, while cooperating with the configurator via the configuration network, configuration of the wireless communication device to enable association of the wireless communication device with the operational network.

14. The wireless communication device of claim 13, wherein the wireless communication device is arranged to extract TCP/IP port information from obtained information on the configuration network.

15. The wireless communication device of claim 13, wherein the wireless communication device is arranged to associate with an open SSID.

16. The wireless communication device of claim 13, wherein the wireless communication device is arranged to use one of a Pre-Shared Key, Simultaneous Authentication of Equals or Enterprise Credentials for association with the operation network.

* * * * *